United States Patent [19]

Swiger et al.

[11] Patent Number: 4,523,001

[45] Date of Patent: Jun. 11, 1985

[54] SCAVENGERS FOR ONE COMPONENT ALKOXY-FUNCTIONAL RTV COMPOSITIONS

[75] Inventors: Roger T. Swiger, Schenectady; John E. Hallgren, Scotia, both of N.Y.

[73] Assignee: General Electric Company, Waterford, N.Y.

[21] Appl. No.: 476,000

[22] Filed: Mar. 17, 1983

[51] Int. Cl.$^3$ .................. C08L 83/04; C08G 77/26; C08G 77/04

[52] U.S. Cl. ........................ 528/18; 528/15; 528/17; 528/19; 528/24; 528/26; 528/28; 528/33; 528/34; 528/38; 528/901

[58] Field of Search ................ 528/15, 17, 18, 19, 528/24, 26, 28, 33, 34, 38, 901

[56] References Cited

U.S. PATENT DOCUMENTS

| | | | |
|---|---|---|---|
| Re. 29,760 | 9/1978 | Brown et al. | 528/41 |
| 3,065,194 | 11/1962 | Nitzsche et al. | 524/788 |
| 3,122,522 | 2/1964 | Brown et al. | 528/31 |
| 3,127,363 | 3/1964 | Nitzsche et al. | 424/78 |
| 3,133,891 | 5/1964 | Ceyzeriat | 528/18 |
| 3,161,614 | 12/1964 | Brown et al. | 528/36 |
| 3,170,894 | 2/1965 | Brown et al. | 528/34 |
| 3,294,739 | 12/1966 | Weyenberg | 528/17 |
| 3,296,161 | 1/1967 | Kulpa | 528/34 |
| 3,296,195 | 1/1967 | Goossens | 528/34 |
| 3,305,525 | 2/1967 | Goossens | 528/38 |
| 3,334,067 | 8/1967 | Weyenberg | 528/17 |
| 3,364,160 | 1/1968 | Golitz | 528/18 |
| 3,378,520 | 4/1968 | Sattlegger et al. | 528/33 |
| 3,383,355 | 5/1968 | Cooper | 528/14 |
| 3,408,325 | 10/1968 | Hittmair et al. | 528/32 |
| 3,438,930 | 4/1969 | Beers | 524/786 |
| 3,471,434 | 10/1969 | Pande et al. | 524/859 |
| 3,542,901 | 4/1970 | Cooper et al. | 528/33 |
| 3,549,590 | 12/1970 | Holdstock et al. | 528/32 |
| 3,560,442 | 2/1971 | Golitz | 528/34 |
| 3,622,529 | 11/1971 | Evans | 528/17 |
| 3,647,917 | 3/1972 | Schulz et al. | 528/33 |
| 3,665,026 | 5/1972 | Evans | 556/410 |
| 3,689,454 | 9/1972 | Smith et al. | 528/17 |
| 3,779,986 | 12/1978 | Smith et al. | 528/17 |
| 3,796,686 | 3/1974 | Golitz et al. | 428/412 |
| 3,819,563 | 6/1974 | Takago et al. | 524/449 |
| 3,826,782 | 7/1974 | Lengnick | 528/33 |
| 3,829,529 | 8/1974 | Lengnick | 528/25 |
| 3,839,386 | 10/1974 | Lengnick | 556/422 |
| 3,886,118 | 5/1975 | Nitzsche et al. | 528/18 |
| 3,933,729 | 1/1976 | Letoffe | 524/588 |
| 3,983,265 | 9/1976 | Letoffe | 427/58 |
| 4,170,700 | 10/1979 | Sweet | 528/12 |
| 4,180,642 | 12/1979 | Takago | 528/32 |
| 4,248,993 | 2/1981 | Takago | 528/38 |
| 4,257,932 | 3/1981 | Beers | 524/588 |
| 4,267,297 | 5/1981 | Hanada et al. | 528/18 |
| 4,377,706 | 3/1983 | Halleren | 556/470 |
| 4,395,526 | 7/1983 | White et al. | 528/18 |
| 4,417,042 | 11/1983 | Dziark | 528/18 |
| 4,424,157 | 1/1984 | Chung | 528/901 |

FOREIGN PATENT DOCUMENTS

| | | |
|---|---|---|
| 1058254 | 5/1959 | Fed. Rep. of Germany . |
| 1262450 | 4/1961 | France . |
| 1273907 | 5/1972 | United Kingdom . |

*Primary Examiner*—Herbert J. Lilling
*Attorney, Agent, or Firm*—Gary L. Loser

[57] ABSTRACT

Stable, substantially acid-free, one package moisture curable organopolysiloxane compositions are provided having a condensation catalyst such as a tin compound and novel scavenger or scavenger/crosslinker compositions. A method for making the aforesaid moisture curable organopolysiloxane composition is also provided.

37 Claims, No Drawings

SCAVENGERS FOR ONE COMPONENT ALKOXY-FUNCTIONAL RTV COMPOSITIONS

BACKGROUND OF THE INVENTION

The present invention relates to one component alkoxy-functional room temperature vulcanizable (RTV) compositions. More particularly, the present invention relates to such one component alkoxy-functional RTV compositions having novel scavenger compositions or integrated scavenger/crosslinker compositions incorporated therein.

An early one component alkoxy-functional RTV composition is disclosed in Nitzsche et al., U.S. Pat. No. 3,065,194. Therein is is taught that a mixture of an end-blocked dimethylsiloxane polymer such as, for example, hydroxy or alkoxy end-blocked, an inert filler, ethylorthosilicate and dibutyltindilaurate can be vulcanized upon contact with water after a 14 day shelf period at room temperature. However, during preparation of the RTV composition the various ingredients of the mixture have to be vigorously dried by heating for one hour at 200° C., and the RTV composition, after a relatively short shelf period, has to be drenched with water to effect curing.

Improved results toward combining the advantages of a noncorrosive acid-free polyalkoxysilane crosslinking agent with a silanol-terminated polydiorganosiloxane as a one package system are described in Weyenberg, U.S. Pat. No. 3,334,067, Cooper et al., U.S. Pat. No. 3,542,901, and Smith et al., U.S. Pat. Nos. 3,689,454 and 3,779,986. These disclosures utilize various titanium chelates as condensation catalysts in place of tin soap catalysts to accelerate cure of the RTV composition. One shortcoming of such one package systems was that after they were allowed to age for a period of five hours or more, the tack-free time of the aged RTV composition was considerably longer than the tack-free time of the same mixture after it was initially mixed and immediately exposed to atmospheric moisture.

Recently a shelf-stable, fast-curing, one component alkoxy-functional RTV composition was disclosed in the co-pending patent application of White et al., Ser. No. 277,524, filed June 26, 1981, now U.S. Pat. No. 4,395,526, and assigned to the same assignee as the present invention. Basically White et al. disclose that moisture curable polyalkoxy-terminated organopolysiloxane. RTV compositions can be made by combining (1) a silanol terminated polydiorganosiloxane; (2) a cross-linking silane; (3) an effective amount of certain silane scavengers for chemically combined hydroxy radicals; and (4) an effective amount of a condensation catalyst. The scavenger, which can be either a separate compound or part of the alkoxy-functional crosslinking agent, has a functionality selected from the group consisting of oximato, carbamato, enoxy, amino, amido, imidato, ureido, isocyanato and thioisocyanato.

Other scavenger compositions that may be utilized in the White et al. one component, alkoxy functional RTV composition are disclosed in copending patent applications by Dziark, Ser. No. 349,695, filed Feb. 17, 1982, now U.S. Pat. No. 4,417,042; Lucas, Ser. No. 449,105, filed Dec. 13, 1982; Chung et al., Ser. No. 428,038, filed Sept. 29, 1982; Chung et al., Ser. No. 437,895, filed Nov. 1, 1982, now abandoned, and Chung, Ser. No. 338,518, filed Jan. 11, 1982, now U.S. Pat. No. 4,424,157, all of which are assigned to the same assignee as the present invention and incorporated by reference into the instant disclosure.

Although each of the aforementioned patent applications discloses scavenger compositions and/or integrated scavenger/crosslinker compositions useful in RTV systems of the type disclosed by White et al., it was not heretofore appreciated that compounds other than silanes and silazanes can be effective scavenger or integrated scavenger/crosslinker compositions.

Accordingly, the present invention provides additional scavenger and integrated scavenger/crosslinker compositions which do not rely upon having silane or silazane functionality or structure. That is, scavengers provided by the present invention include compositions having chemical bonding between, for example, silicon and silicon, silicon and phosphorous, silicon and carbon, and silicon and oxygen.

It is therefore an object of the present invention to provide novel scavengers for one component alkoxy-functional RTV compositions which make such RTV compositions shelf-stable and fast-curing.

It is another object of the present invention to provide non-corrosive, one component alkoxy-functional RTV compositions that are shelf-stable and fast curing.

It is a further object of the present invention to provide a process for producing a relatively inexpensive, noncorrosive, one component RTV composition which is shelf-stable and fast-curing and which does not have an objectionable odor.

Other objects and advantages of the present invention will be obvious from the following detailed description.

SUMMARY OF THE INVENTION

In accordance with one aspect of the present invention there is provided a stable, one package, substantially anhydrous and substantially acid-free room temperature vulcanizable organopolysiloxane composition stable under ambient conditions in the substantial absence of moisture over an extended period of time and convertible to a tack-free elastomer comprising:

(A) a silanol-terminated organosiloxane base polymer;

(B) an effective amount of condensation catalyst;

(C) a stabilizing amount of scavenger for hydroxy functional groups having the general formula $$(R^1O)_{\overline{4-(c+d+e)}}-\underset{(R^2)_c}{\overset{(Y_n)_e}{Si}}-(X)_d \qquad (i)$$

where: $R^1$ is an aliphatic radical having 1 to 8 carbon atoms and is selected from the group consisting of alkyl radicals, alkylether radicals, alkylester radicals, alkylketone radicals and alkylcyano radicals or an aralkyl radical having 7 to 13 carbon atoms; $R^2$ is a monovalent substituted or unsubstituted hydrocarbon radical having 1 to 13 carbon atoms; X is a hydrolyzable leaving group selected from the group consisting of amido, amino, carbamato, enoxy, imidato, isocyanato, oximato, thioisocyanato and ureido radicals; Y is selected from the group consisting of moieties of Si, O, S, N, P, C, B, Sn, Pb, Ca, hydrazine, azo radicals, CO, $CO_2$, organic peroxides and metal oxides of the formula $AO_z$ where A is selected from the group consisting of B, S, Sn, P, Al, Ti, V, Tl, Ir, Pb, Pt, Pd and Fe and where z is sufficient to satisfy chemical valence requirements; where C is attached to at least one other Y moiety; c is an integer equal to 0 to 1; d is an integer equal to 1 or 2; e is an integer equal to 1 or 2; the sum of c+d+e equals 2 or 3; n equals at least 1; or

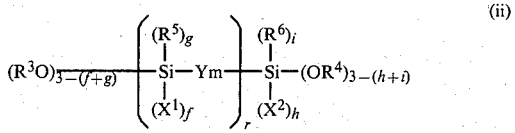

where $R^3$ and $R^4$ are aliphatic radicals having 1 to 8 carbon atoms and are selected from the group consisting of alkyl radicals, alkylether radials, alkylester radicals, alkylketone radicals and alkylcyano radicals or an aralkyl radical having 7 to 13 carbon atoms; $R^5$ and $R^6$ are monovalent substituted or unsubstituted hydrocarbon radicals having 1 to 13 carbon atoms or Yn; Y is selected from the group consisting of moieties of Si, O, S, N, P, C, B, Sn, Pb, Ca, hydrazine, azo radicals, CO, $CO_2$, organic peroxides and metal oxides of the formula $AO_z$ where A is selected from the group consisting of B, S, Sn, P, Al, Ti, V, Tl, Ir, Pb, Pt, Pd and Fe, and z is sufficient to satisfy chemical valence requirements; $X^1$ and $X^2$ are hydrolyzable leaving groups selected from the group consisting of amido, amino, carbamato, enoxy, imidato, isocyanato, oximato, thioisocyanato and ureido radicals; f is an integer equal to 0 to 2 inclusive; g is an integer equal to 0 to 2 inclusive; h is an integer equal to 0 to 3 inclusive; i is an integer equal to 0 to 3 inclusive; the sum of f+g equals 0 to 3 inclusive; the sum of h+f equals at least 1; the sum of h+i equals 0 to 2 inclusive; m is equal to 0 or more and r is equal to at least 1; or (iii) a cyclic compound with at least one silicon atom as a member of the ring, said silicon atom having attached thereto a hydrolyzable leaving group selected from the group consisting of amido, amino, carbamato, enoxy, imidato, isocyanato, oximato, thioisocyanato and ureido radicals; and wherein at least 1 of said silicon atoms has attached thereto an alkoxy radical having an aliphatic group of 1 to 8 carbon atoms selected from the group consisting of alkyl radicals, alkylether radicals, alkylester radicals, alkylketone radicals, and alkylcyano radicals or an aralkyl radical having 7 to 13 carbon atoms, and wherein the total number of hydrolyzable groups is at least three, or (iv) mixtures of (i) and (ii) and (iii); and where the hydrolyzable group is enoxy (D) an effective amount of curing accelerator selected from the group consisting of substituted guanidines, amines and mixtures thereof.

In another aspect of the present invention there is provided a stable, one package, substantially anhydrous and substantially acid free room temperature vulcanizable organopolysiloxane composition stable under ambient conditions in the substantial absence of moisture over an extended period of time and convertible to a tack-free elastomer comprising:

(A) an alkoxy-terminated organosiloxane base polymer;

(B) an effective amount of condensation catalyst;

(C) a stabilizing amount of scavenger for hydroxy functional groups having the general formula

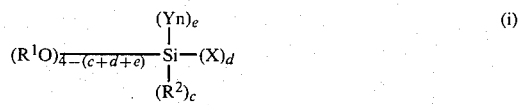

where: $R^1$ is an aliphatic radical having 1 to 8 carbon atoms and is selected from the group consisting of alkyl radicals, alkylether radicals, alkylester radicals, alkylketone radicals and alkylcyano radicals or an aralkyl radical having 7 to 13 carbon atoms; $R^2$ is a monovalent substituted or unsubstituted hydrocarbon radical having 1 to 13 carbon atoms; X is a hydrolyzable leaving group selected from the group consisting of amido, amino, carbamato, enoxy, imidato, isocyanato, oximato, thioisocyanato and ureido radicals; Y is selected from the group consisting of moieties of Si, O, S, N, P, C, B, Sn, Pb, Ca, hydrazine, azo radicals, CO, $CO_2$, organic peroxides and metal oxides of the formula $AO_z$ where A is selected from the group consisting of B, S, Sn, P, Al, Ti, V, Tl, Ir, Pb, Pt, Pd and Fe and where z is sufficient to satisfy chemical valence requirements; where C is attached to at least one other Y moiety; c is an integer equal to 0 to 2; d is an integer equal to 1 to 3; e is an integer equal to 1 to 3; the sum of c+d+e equals 2 to 4; n equals at least 1; or

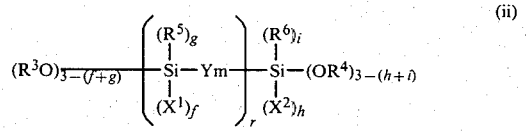

where: $R^3$ and $R^4$ are aliphatic radicals having 1 to 8 carbon atoms and are selected from the group consisting of alkyl radicals, alkylether radials, alkylester radicals, alkylketone radicals and alkylcyano radicals or an aralkyl radical having 7 to 13 carbon atoms; $R^5$ and $R^6$ are monovalent substituted or unsubstituted hydrocarbon radicals; having 1 to 13 carbon atoms or Yn; Y is selected from the group consisting of moieties of Si, O, S, N, P, C, B, Sn, Pb, Ca, hydrazine, azo radicals, CO, $CO_2$, organic peroxides and metal oxides of the formula $AO_z$ where A is selected from the group consisting of B, S, Sn, P, Al, Ti, V, Tl, Ir, Pb, Pt, Pd and Fe, and z is sufficient to satisfy chemical valence requirements; $X^1$ and $X^2$ are hydrolyzable leaving groups selected from the group consisting of amido, amino, carbamato, enoxy, imidato, isocyanato, oximato, thioisocyanato and ureido radicals; f is an integer equal to 0 to 3 inclusive; g is an integer equal to 0 to 3 inclusive; h is an integer equal to 0 to 3 inclusive; i is an integer equal to 0 to 3 inclusive; the sum of f+g equals 0 to 3 inclusive; the sum of h+f equals at least 1; the sum of h+i equals at 0 to 3 inclusive; m is equal to 0 or more and r is equal to at least 1; or (iii) a cyclic compound with at least one silicon atom as a member of the ring, said silicon atom having attached thereto a hydrolyzable leaving group selected from the group consisting of amido, amino, carbamato, enoxy, imidato, isocyanato, oximato, thioisocyanato and ureido radicals; or (iv) mixtures of (i) and (ii) and (iii).

DESCRIPTION OF THE INVENTION

The present invention provides a stable, one package, substantially anhydrous and substantially acid-free room temperature vulcanizable organopolysiloxane composition stable under ambient conditions in the substantial absence of moisture over an extended period of time and convertible to a tack-free elastomer comprising:

(A) an alkoxy-terminated or silanol-terminated organopolysiloxane base polymer;

(B) an effective amount of condensation catalyst;

(C) a stabilizing amount of scavenger composition for scavenging hydroxy functional radicals having the general formula (i)                                                                                             (1)

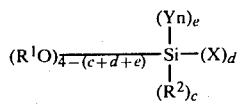

where $R^1$ is an aliphatic radical having 1 to 8 carbon atoms and is selected from the group consisting of alkyl radicals, alkylether radicals, alkylester radicals, alkylketone radicals and alkylcyano radicals or an aralkyl radical having 7 to 13 carbon atoms; $R^2$ is a monovalent substituted or unsubstituted hydrocarbon radical having 1 to 13 carbon atoms; X is a hydrolyzable leaving group selected from the group consisting of amido, amino, carbamato, enoxy, imidato, isocyanato, oximato, thioisocyanato and ureido radicals; Y is selected from the group consisting of moieties of Si, O, S, N, P, C, B, Sn, Pb, Ca, hydrazine, azo radicals, CO, $CO_2$, organic peroxides and metal oxides of the formula $AO_z$ where A is selected from the group consisting of B, S, Sn, P, Al, Ti, V, Tl, Ir, Pb, Pt, Pd and Fe and where z is sufficient to satisfy chemical valence requirements; where C is attached to at least one other Y moiety; c is an integer equal to 0 to 1; d is an integer equal to 1 or 2; e is an integer equal to 1 or 2; the sum of $c+d+e$ equals 2 or 3; n equals at least 1; or (ii)                                                                                           (2)

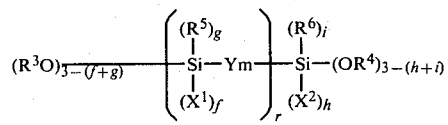

where $R^3$ and $R^4$ are aliphatic radicals having 1 to 8 carbon atoms and are selected from the group consisting of alkyl radicals, alkylether radials, alkylester radicals, alkylketone radicals and alkylcyano radicals or an aralkyl radical having 7 to 13 carbon atoms; $R^5$ and $R^6$ are monovalent substituted or unsubstituted hydrocarbon radicals having 1 to 13 carbon atoms or Yn; Y is selected from the group consisting of moieties of Si, O, S, N, P, C, B, Sn, Pb, Ca, hydrazine, azo radicals, CO, $CO_2$, organic peroxides and metal oxides of the formula $AO_z$ where A is selected from the group consisting of B, S, Sn, P, Al, Ti, V, Tl, Ir, Pb, Pt, Pd and Fe, and z is sufficient to satisfy chemical valence requirements; $X^1$ and $X^2$ are hydrolyzable leaving groups selected from the group consisting of amido, amino, carbamato, enoxy, imidato, isocyanato, oximato, thioisocyanato and ureido radicals; f is an integer equal to 0 to 3 inclusive; g is an integer equal to 0 to 3 inclusive; h is an integer equal to 0 to 3 inclusive; i is an integer equal to 0 to 3 inclusive; the sum of $f+g$ equals 0 to 3 inclusive; the sum of $h+f$ equals at least 1; the sum of $h+i$ equals at 0 to 2 inclusive; m is equal to 0 or more and r is equal to at least 1; or (iii) a cyclic compound with at least one silicon atom as a member of the ring, said silicon atom having attached thereto a hydrolyzable leaving group selected from the group consisting of amido, amino, carbamato, enoxy, imidato, isocyanato, oximato, thioisocyanato and ureido radicals; and wherein at least 1 of said silicon atoms has attached thereto an alkoxy radical having an aliphatic group of 1 to 8 carbon atoms selected from the group consisting of alkyl radicals, alkylether radicals, alkylester radicals, alkylketone radicals, and alkylcyano radicals or an aralkyl radical having 7 to 13 carbon atoms, and wherein the total number of hydrolyzable groups is at least three, or (iv) mixtures of (i) and (ii) and (iii); when the base polymer is silanol-terminated and, when the base polymer is alkoxy-terminated, a scavenger having the general formula (i)                                                                      (1a)

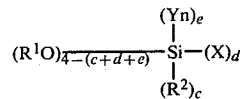

where $R^1$ is an aliphatic radical having 1 to 8 carbon atoms and is selected from the group consisting of alkyl radicals, alkylether radicals, alkylester radicals, alkylketone radicals and alkylcyano radicals or an aralkyl radical having 7 to 13 carbon atoms; $R^2$ is a monovalent substituted or unsubstituted hydrocarbon radical having 1 to 13 carbon atoms; X is a hydrolyzable leaving group selected from the group consisting of amido, amino, carbamato, enoxy, imidato, isocyanato, oximato, thioisocyanato and ureido radicals; Y is selected from the group consisting of moieties of Si, O, S, N, P, C, B, Sn, Pb, Ca, hydrazine, azo radicals, CO, $CO_2$, organic peroxides and metal oxides of the formula $AO_z$ where A is selected from the group consisting of B, S, Sn, P, Al, Ti, V, Tl, Ir, Pb, Pt, Pd and Fe and where z is sufficient to satisfy chemical valence requirements; where C is attached to at least one other Y moiety; c is an integer equal to 0 to 2; d is an integer equal to 1 to 3; e is an integer equal to 1 to 3; the sum of $c+d+e$ equals 2 to 4; n equals at least 1; or (ii)                                                                    (2a)

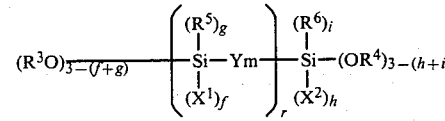

where $R^3$ and $R^4$ are aliphatic radicals having 1 to 8 carbon atoms and are selected from the group consisting of alkyl radicals, alkylether radials, alkylester radicals, alkylketone radicals and alkylcyano radicals or an aralkyl radical having 7 to 13 carbon atoms; $R^5$ and $R^6$ are monovalent substituted or unsubstituted hydrocarbon radicals having 1 to 13 carbon atoms or Yn; Y is selected from the group consisting of moieties of Si, O, S, N, P, C, B, Sn, Pb, Ca, hydrazine, azo radicals, CO, $CO_2$, organic peroxides and metal oxides of the formula $AO_z$ where A is selected from the group consisting of B, S, Sn, P, Al, Ti, V, Tl, Ir, Pb, Pt, Pd and Fe, and z is sufficient to satisfy chemical valence requirements; $X^1$ and $X^2$ are hydrolyzable leaving groups selected from the group consisting of amido, amino, carbamato, enoxy, imidato, isocyanato, oximato, thioisocyanato and ureido radicals; f is an integer equal to 0 to 3 inclusive; g is an integer equal to 0 to 3 inclusive; h is an integer equal to 0 to 3 inclusive; i is an integer equal to 0 to 3 inclusive; the sum of f+g equals 0 to 3 inclusive; the sum of h+f equals at least 1; the sum of h+i equals at 0 to 3 inclusive; m is equal to 0 or more and r is equal to at least 1; or (iii) a cyclic compound with at least one silicon atom as a member of the ring, said silicon atom having attached thereto a hydrolyzable leaving group selected from the group consisting of amido, amino, carbamato, enoxy, imidato, isocyanato, oximato, thioisocyanato and ureido radicals; or (iv) mixtures of (i) and (ii) and (iii);

(D) when the hydrolyzable group is enoxy and the base polymer is silanol-terminated, an effective amount of curing accelerator selected from the group consisting of substituted guanidines, amines and mixtures thereof, and optionally, when the hydrolyzable group is selected from the group consisting of amido, amino, carbamato, imidato, isocyanato, oximato, thioisocyanato and ureido radicals, and the base polymer is either alkoxy-terminated or silanol terminated, an effective amount of curing accelerator selected from the group consisting of substituted guanidines, amines and mixtures thereof; and (E) optionally, an effective amount of a crosslinking silane of the formula

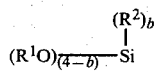

where $R^1$ is an aliphatic radical having from 1 to 8 carbon atoms and is selected from the group consisting of alkyl radicals, alkylether radicals, alkylester radicals, alkylketone radicals and alkylcyano radicals or an aralkyl radical having 7 to 13 carbon atoms, $R^2$ is a monovalent substituted or unsubstituted hydrocarbon radical having 1 to 13 carbon atoms and b is a whole number equal to 0 or 1.

The base polymer of the present invention can be either a silanol endstopped or alkoxy endstopped polydiorganosiloxane. Silanol-terminated polydiorganosiloxanes are well known in the art and have the general formula

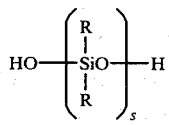

where R is a monovalent substituted or unsubstituted hydrocarbon radical having 1 to 13 carbon atoms, preferably methyl or a mixture of a major amount of methyl and a minor amount of phenyl, cyanoethyl, trifluoropropyl, vinyl and mixtures thereof, and s is an integer having a value up to about 2500.

Silanol-terminated polydiorganosiloxanes of formula (3) preferably have a viscosity in the range of from about 100 to about 400,000 centipoise at 25° C. These silanol-terminated fluids can be made by treating a higher molecular weight organopolysiloxane, such as dimethylpolysiloxane with water in the presence of an acid, or base catalyst, to tailor the viscosity of the polymer to the desired range. Methods for making sure higher molecular weight organopolysiloxanes are also well known. For example, hydrolysis of a diorganohalosilane such as dimethyldichlorosilane, diphenyldichlorosilane, methylvinyldichlorosilane, or mixtures thereof can provide for the production of low molecular weight hydrolyzate. Equilibration thereafter can provide for higher molecular weight organopolysiloxanes. Equilibration of cyclopolysiloxane such as octamethylcyclotetrasiloxane, octaphenylcyclotetrasiloxane, or mixtures thereof will also provide for higher molecular weight polymers. Preferably such polymers are decatalyzed of equilibration catalyst by standard procedures prior to use, such as shown by Boot, U.S. Pat. No. 3,153,007, assigned to the same assignee as the present invention.

Crosslinking silnes having the general formula

where $R^1$ is an aliphatic radical having 1 to 8 carbon atoms and is selected from the group consisting of alkyl radicals, alkylether radicals, alkylester radicals, alkylketone radicals and alkylcyano radicals or an aralkyl radical having 7 to 13 carbon atoms; $R^2$ is a monovalent substituted or unsubstituted hydrocarbon radical having 1 to 13 carbon atoms; and b is a whole number equal to 0 or 1, are also included in prior art one-component RTV compositions to provide polyalkoxy-terminated organopolysiloxanes having the general formula

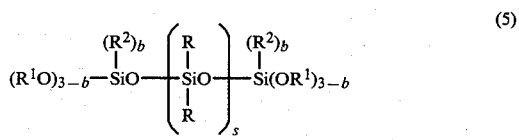

where R, $R^1$, $R^2$ and b are as previously defined.

Some of the crosslinking polyalkoxysilanes included within formula (4) are, for example, methyltrimethoxysilane, methyltriethoxysilane, ethyltrimethoxysilane, tetraethoxysilane and vinyltrimethoxysilane.

In the presence of a suitable condensation catalyst and moisture, crosslinking of the polyalkoxy-terminated organopolysiloxane is effected to provide a composition useful, for example, as a sealant or caulking material. Effective condensation catalysts include tin compounds, zirconium compounds, and titanium compounds, for example, dibutyltindilaurate, dibutyltindiacetate, dibutyltindimethoxide, tin octoate, 1,3-propanedioxytitanium bis-(ethylacetoacetate), 1,3-propanedioxytitanium bis(acetylacetonate), and zirconium octoate.

Further examples of metal condensation catalysts are lead 2-ethyloctoate, iron 2-ethylhexoate, cobalt 2-ethylhexoate, manganese 2-ethylhexoate, zinc 2-ethylhexoate, antimony octoate, bismuth naphthenate, zinc naphthenate and zinc stearate.

Examples of nonmetal condensation catalysts are hexylammonium acetate and benzyltrimethylammonium acetate.

White et al., in copending patent application Ser. No. 277,524, filed June 26, 1981, now U.S. Pat. No.

4,395,526, and incorporated herein by reference, improved upon such prior art compositions by incorporating an effective amount of certain silane scavengers for eliminating hydroxy radicals normally present in RTV compositions, for example, from trace amounts of water, methanol, silanol radicals on the silica filler (if used), and silanol-terminated polymer of formula (3).

Generally White et al. disclose a silane scavenger for eliminating chemically combined hydroxy radicals having the formula

where $R^1$, $R^2$ and X are as previously defined, a is an integer equal to 1 or 2 and preferably 1, b is a whole number equal to 0 or 1 and the sum of $a+b$ is equal to 1 or 2. In formula (6), where a is 2, X can be the same or different radicals. The leaving group X reacts preferentially before $-OR^1$ with available $-OH$ in the RTV composition and provides an RTV composition substantially free of halogen acid or carboxylic acid. The silane scavenger of formula (6) is both the silane scavenger for hydroxy functional groups and a polyalkoxysilane crosslinking agent for terminating the silicon atom at each organopolysiloxane chain end with at least two alkoxy radicals.

Where polyalkoxy-terminated polymer is made without using silane scavenger of formula (6), silane scavenger can be used which has less than two $-OR^1$ radicals attached to silicon, as shown by the formula

where $R^1$, $R^2$ and X are as previously defined, c is a whole number equal to 0 to 3 inclusive, d is an integer equal to 1 to 4 inclusive and the sum of $c+d$ is equal to 3 or 4. In such situations the scavenging silanes of formula (7) can be used in an amount sufficient to stabilize the RTV composition.

White et al. further disclose that improved cure rates can be achieved if minor amounts of amines, substituted guanidines or mixtures thereof, are utilized as curing accelerators. These curing accelerators also serve to catalyze the ability of the enoxy leaving group to act as a scavenger. There can be used from 0.1 to 5 parts, and preferably from about 0.3 to 1 part of curing accelerator per 100 parts of silanol-terminated polymer or per 100 parts of polyalkoxy-terminated polymer to substantially reduce the tack-free time (TFT) of the RTV composition. This enhanced cure rate is maintained after it has been aged for an extended shelf period, for example, six months or more at ambient temperatures, or a comparable period under accelerated aging conditions. The cure properties after the extended shelf period are substantially the same as the initial cure properties, for example, tack-free time, shown by the RTV composition upon being freshly mixed and immediately exposed to atmospheric moisture.

Among the curing accelerators which can be used are silyl-substituted guanidines having the formula $$(Z)_g Si(OR^1)_{4-g} \qquad (8)$$

where $R^1$ is as previously defined, g is equal to 1 to 3 inclusive, and Z is a guanidine radical of the formula

where $R^3$ is an alkylene radical having 2 to 8 carbon atoms; $R^4$ and $R^5$ are independently selected from hydrogen and alkyl radicals having 1 to 8 carbon atoms. In addition, alkyl substituted guanidines having the formula

where $R^4$ and $R^5$ are as previously defined and $R^6$ is an alkyl radical having 1 to 8 carbon atoms, also can be employed. Some of the silyl substituted guanidines included within formula (8) are shown by Takago in U.S. Pat. Nos. 4,180,642 and 4,248,993.

In addition to the above substituted guanidines, there can be used various amines, for example, di-n-hexylamine, dicyclohexylamine, di-n-octylamine, hexamethoxymethylmelamine and silylated amines such, for example, gamma-aminopropyltrimethoxysilane and methyldimethoxy-di-n-hexylaminosilane. Methyldimethoxydi-n-hexylaminosilane acts as both a scavenger and curing accelerator. The primary amines, secondary amines and silylated amines are preferred, and secondary amines and silylated amines are particularly preferred. Silylated secondary amines such as alkyldialkoxy-n-dialkylaminosilanes and guanidines such as alkyldialkoxyalkylguanidylsilanes which are useful as cure accelerators also act as scavengers, and in certain instances, as stabilizers. By stabilizer is meant that for particular RTV compositions, catalyzed with certain condensation catalysts, there is a marked lengthening of tack-free time after accelerated aging. For this class of condensation catalysts, addition of amines, substituted guanidines, and mixtures thereof provide stable RTV compositions which exhibit a fast cure rate initially, i.e., less than about 30 minutes which remains substantially unchanged after accelerated aging.

The present invention is based on the discovery that effective scavenger compositions are provided by compounds having at least one Si—X bond, where X is a hydrolyzable group as previously defined. Although the present invention provides a much broader spectrum of scavenger compositions and scavenger/crosslinker compositions than heretofore available, it is important to note that whether a compound will function as one or the other also depends upon whether the base polymer is silanol-terminated or alkoxy-terminated. Moreover, in the case of alkoxy-terminated base polymers, whether a compound will operate as a scavenger only or as a scavenger/crosslinker depends on whether the polymer is monoalkoxy or polyalkoxy-terminated. Accordingly, compounds coming within the scope of the present invention must be considered in terms of whether they are to be used in combinations with a silanol, monoalkoxy or polyalkoxy-terminated diorganopolysiloxane base polymer to determine whether they will function as scavengers only or as scavenger/crosslinkers.

The first type of compositions coming within the scope of the present invention are described by formula (1) as silane derivatives whose distinguishing feature, in addition to having at least one hydrolyzable group, is that at least one Y group is attached to the silicon atom. As disclosed hereinabove, Y is selected from the group consisting of moieties of Si, O, S, N, P, C, B, Sn, Pb, Ca, hydrazine, azo radicals, CO, $CO_2$, organic peroxides and metal oxides of the formula $AO_z$ where A is selected from the group consisting of B, S, Sn, P, Al, Ti, V, Tl, Ir, Pb, Pt, Pd and Fe, where z is sufficient to satisfy chemical valence requirements, C is attached to at least one other Y moiety and n equals at least 1. Furthermore, $R^1$ is an aliphatic radical having 1 to 8 carbon atoms which is selected from the group consisting of alkyl radicals, alkylether radicals, alkylester radicals, alkylketone radicals, alkylcyano radicals or an aralkyl radical having 7 to 13 carbon atoms; and X is a hydrolyzable leaving group selected from the group consisting of amido, amino, carbamato, enoxy, imidato, isocyanato, oximato, thioisocyanato and ureido radicals.

When the base polymer is silanol-terminated, the value of c equals 0 or 1, d equals 1 or 2, e equals 1 or 2 and the sum of $c+d+e$ equals 2 or 3. Thus, in this instance there must be at least one X group, one Y group and one alkoxy group. However, it should be clear to the artisan that if the compound is to function as a scavenger/crosslinker there must be a total of three hydrolyzable groups, either two X groups and one alkoxy group or two alkoxy groups and one X group. Since it is preferable that the compound be provided in a form such that it functions as a scavenger/crosslinker, the preferred formula of the composition is either.

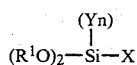  (11)

or

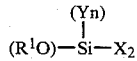  (11a)

where $R^1$, X, Y and n are as previously defined. Since at least three hydrolyzable groups are necessary in order to function as a crosslinker and inasmuch as there must be at least one Y group, compounds of formulas (11) and (11a) are the only ones which can function as both a scavenger and a crosslinker within this embodiment of the present invention (i.e. there can be no $R^2$ radical as there must be three hydrolyzable groups and a Y radical).

When an alkoxy terminated base polymer is utilized in the practice of the invention, one must consider whether the polymer is monoalkoxy or polyalkoxy-terminated. The simplest case, of course, is when the base polymer is polyalkoxy endstopped as in such case crosslinking will be effected when the composition of the present invention is exposed to moisture in the presence of a suitable condensation catalyst, several of which catalysts are disclosed hereinabove. Thus, all that is required with a polyalkoxy-terminated base polymer is a silane scavenger of the general formula

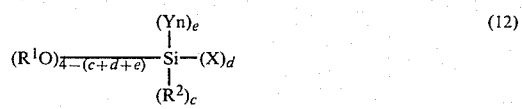

and having at least one Y group and at least one hydrolyzable X group, where X and Y are as described hereinabove.

On the other hand, when a monoalkoxy-terminated base polymer is utilized to practice the present invention, when the scavenger composition has only one or two hydrolyzable groups, including the required X group, the composition will function only as a scavenger. Hence, when the invention is to be practiced by utilizing a monoalkoxy chainstopped polymer, a compound of formula (11) or (11a) must be included, or a compound having only one or two hydrolyzable groups may be used in combination with a crosslinking silane of formula (4). The latter case is, of course, much the same as if a silanol endstopped base polymer had been utilized since in any embodiment the compound of formula (1) can be used as a scavenger only so long as a crosslinking silane of formula (4) is included.

Thus, it can readily be seen that when the base polymer is polyalkoxy chainstopped, the value of c in formula (1) equals 0 to 2, d equals 1 to 3, e equals 1 to 3 and the sum of $c+d+e$ equals 2 to 4. Also, when the base polymer is monoalkoxy-terminated, it can be seen that the value of c equals 0 or 1, d equals 1 or 2, e equals 1 or 2 and $c+d+e$ equals 2 or 3.

It is also important to note that when a monoalkoxy-terminated base polymer is utilized, in order to obtain a sufficiently rapid curing rate, it is desirable to utilize a scavenger/crosslinker embodiment or a scavenger only embodiment in combination with a crosslinking silane.

Accordingly, it is obvious to the artisan that a large number of combinations are possible; however, it is equally obvious that the invention resides in the discovery that Si—X hydrolyzable bonds will provide a scavenger composition. Thus, it is within the skill of the artisan to determine precisely how many alkoxy radicals, X radicals and Y radicals are needed to meet his specific requirements. Furthermore, it should be recognized that the foregoing discussion is to alert the artisan to the fact that the base polymer terminal units affect whether a given compound will act as a scavenger only or as both a scavenger and a crosslinker.

A second embodiment of the present invention is based on compositions illustrated by formula (2). Central to this embodiment is the discovery that an effective scavenger or integrated scavenger/crosslinker is provided by a composition which includes at least one Si—X bond at some location in the molecule. This embodiment differs from the foregoing in that Y can be attached not only to a single silicon, but also is attached to at least one other Y moiety as previously described. Thus, for example, the present invention contemplates linkages such as

  [1]

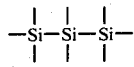

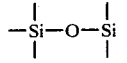

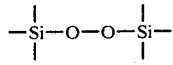

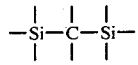

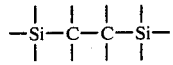

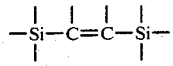

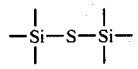

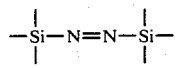

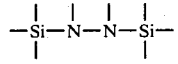

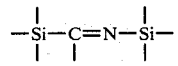

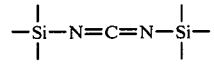

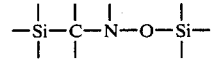

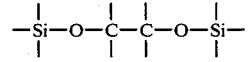

[1]

[2]

[3]

[4]

[5]

[6]

[7]

[8]

[9]

[10]

[11]

[12]

[13]

[14]

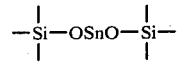

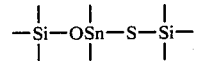

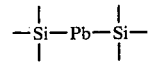

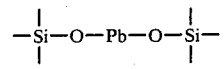

[15]

[16]

[17]

[18]

The foregoing examples of chain linkage are meant only to illustrate the wide variety of compositions which fall within the scope of the present invention and are not intended to be limiting in any manner. Additionally, it should be noted that the number of Y moieties between silicon atoms can be substantial in number for example as large as 5 or more. Also, to be within the scope of the instant invention it is necessary only that there be at least one Si—X bond, although it is much more desirable to have additional Si—X bonds so as to make the molecule a more efficient scavenger. It is important to note that the X groups need not be bonded only to terminal silicon atoms; that is, when Y is a silicon atom, one or more hydrolyzable X groups can be attached thereto as can be seen more clearly hereinbelow. Furthermore, it should be noted that the terminal atom in the chain need not be a silicon atom as $R^5$ and $R^6$ are each defined so as to include ($Y_n$) as ($Y_n$) is described hereinabove for the first embodiment. Thus, for example, a composition having a chain

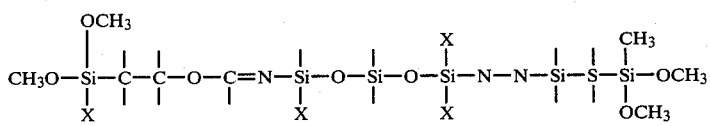

would be a scavenger within the scope of the present invention as there is no requirement that each silicon atom be bonded to an X radical or that the Si—X bonds that are present occur at regular intervals.

More specifically, the above example can be broken down as follows to clearly show its adherence to formula (2).

(i) CH$_3$O is equivalent to $(R^3O)_{3-(f+g)}$ (ii)

$$\begin{matrix} OCH_3 \\ | \\ Si-C-C-O-C=N \\ | \\ X \end{matrix} \text{ is equivalent to } \left(\begin{matrix} (R^5)_{g=1} \\ | \\ Si-Y_{m=5} \\ | \\ (X^1)_{f=1} \end{matrix}\right)_{n=1}$$

where C,C,O,C, and N are each equal to Y

-continued $$\underset{X}{\overset{|}{\underset{|}{Si}}}-O \text{ is equivalent to} \left( \begin{array}{c} (R^5)_{g=1} \\ | \\ -Si-Y_{m=1}- \\ | \\ (X^1)_{f=1} \end{array} \right)_{n=2}$$ (iii)

where O is equal to Y $$\underset{|}{\overset{|}{\underset{|}{Si}}}-O \text{ is equivalent to} \left( \begin{array}{c} (R^5)_{g=2} \\ | \\ -Si-Y_{m=1}- \\ | \\ (X^1)_{f=0} \end{array} \right)_{n=3}$$ (iv)

where O is equal to Y $$\underset{X}{\overset{|}{\underset{|}{Si}}}-\underset{|}{N}-\underset{|}{N} \text{ is equivalent to} \left( \begin{array}{c} (R^5)_{g=1} \\ | \\ -Si-Y_{m=2}- \\ | \\ (X^1)_{f=1} \end{array} \right)_{n=4}$$ (v)

where each N is equivalent ot Y $$\underset{|}{\overset{|}{\underset{|}{Si}}}-\underset{|}{\overset{|}{S}} \text{ is equivalent to} \left( \begin{array}{c} (R^5)_{g=2} \\ | \\ -Si-Y_{m=1}- \\ | \\ (X^1)_{f=0} \end{array} \right)_{n=5}$$ (vi)

where S is equal to Y $$\underset{OCH_3}{\overset{CH_3}{\underset{|}{Si}}}-OCH_3 \text{ is equivalent to } \underset{(X^2)_{h=0}}{\overset{(R^6)_{i=;}}{\underset{|}{Si}}}-(OR^4)_{3-(h+i)}$$ (vii)

Whether a composition according to formula (2) can function only as a scavenger or as an integrated scavenger/crosslinker depends on the number of hydrolyzable groups present in the composition. In fact, it has been found that compositions according to formula (2) of the present invention may include parts which act only as a scavenger while other parts act as both a scavenger and a crosslinker.

Since many compositions within the scope of formula (2) may decompose in order to operate as a scavenger, whether the composition will also serve as a crosslinker must be determined by focusing on each of the decomposition products. Of course, compositions which do not decompose are considered as a whole. That is, to determine whether a composition of formula (2) functions as a scavenger/crosslinker, and the extent to which it operates as a scavenger/crosslinker, the number of hydrolyzable groups is ascertained. To determine the number of hydrolyzable groups it is necessary to also consider whether Y is hydrolyzable.

So that the artisan can more readily understand how to determine whether a composition will operate only as a scavenger or as an integrated scavenger/crosslinker, the following examples are provided.

In a composition having the formula

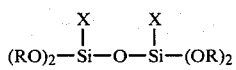

whether by decomposition or as the entire composition, the number of hydrolyzable groups is determined. Since there are six hydrolyzable groups in total, three on each silicon atom, the composition will function as an integrated scavenger/crosslinker.

If the composition were of the formula

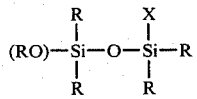

the composition would serve only as a scavenger as at least three hydrolyzable groups are needed to provide an integrated scavenger/crosslinker.

However, when $Y_m$ of formula (2) is hydrolyzable, an integrated scavenger/crosslinker is provided if the composition decomposes in a manner which provides at least three hydrolyzable groups on one component.

As an example, a composition having the formula

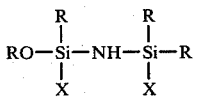

will hydrolyze to one component of the formula

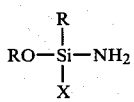

which can operate as an integrated scavenger/crosslinker since $NH_2$, X and RO are hydrolyzable groups, whereas the

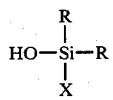

component will operate only as a scavenger.

As in the case of the previous compositions, reference must be made to the base polymer, that is, whether the base polymer is silanol, monoalkoxy or polyalkoxy terminated, to determine the manner in which compositions of formula (2) will function. When the base polymer is silanol-terminated f and g have values equal to 0 to 2 and h and i have values equal to 0 to 3. Furthermore, the sum of f+g equals 0 to 3, the sum of h+i equals 0 to 3 and h+f equals at least 1. Also, it should be noted that at least one alkoxy group must be present per molecule of compound and n equals 0 or more and r equals 1 or more.

When the base polymer is alkoxy-terminated there is no longer the requirement that at least one alkoxy group be present on the compound of formula (2). This is especially true when the base polymer is polyalkoxy endstopped; however, when the base polymer is monoalkoxy endstopped there is preferably 1 or more alkoxy groups bonded to the compound. In the latter case a suitable alternative is to use the scavenger in combination with a crosslinking silane of formula (4).

In those instances where it is desired that the composition act as both a scavenger and crosslinker there must be at least 3 hydrolyzable groups on the compound. Thus, in formula (2), where Y is not hydrolyzable, f equals 0 to 2, g equals 0 to 2, h equals 0 to 2, i equals 0 to 2 and $f+h+[3-(f+g)]+[3-(h+i)]$ equals at least 3; and where Y is hydrolyzable, f, g, h and i again are equal to 0 to 2; however, since Y is also hydrolyzable, the number of hydrolyzable groups in one or more of the decomposition groups must equal three or more. Accordingly, where Y is hydrolyzable, $f+[3-(f+g)]$ equals at least 2 or $h+[3-(h+i)]$ equals 2 or more.

As discussed in the case of silane derivatives, the present invention resides in the recognition that a large number of scavenger compositions are possible as long as there is included at least one Si—X bond in the compound. Again, it is within the skill of the artisan to determine how many alkoxy radicals, Y radicals and X radicals will be most efficient in a given circumstance. It must also be emphasized that the foregoing discussion relating to the functionality of the terminal silicon atoms of the base polymer is merely to aid the artisan in designing a suitable system.

A third type of compound which can be utilized as scavenger or crosslinker/scavenger compositions are cyclic compounds having one or more silicon atoms as a member of the ring and at least one of such silicon atoms having bonded thereto a hydrolyzable leaving group selected from the group disclosed hereinabove. The primary considerations in selecting such a compound are the size of the ring and how many hydrolyzable groups are required. Preferred cyclic compounds are cyclic polysiloxanes having 3 or more siloxane units so that the compound can function as a scavenger/crosslinker (i.e. at least three hydrolyzable groups present, at least one of which is an X radical as described above).

In the case of a silanol-terminated polysiloxane base polymer, the cyclic can include at least one alkoxy radical having an aliphatic group of 1 to 8 carbon atoms selected from the group consisting of alkyl radicals, alkylether radicals, alkylester radicals, alkylketone radicals and alkylcyano radicals or an aralkyl radical having 7 to 13 carbon atoms. Alternatively, there can be utilized in combination a cyclic scavenger composition and a crosslinking silane of formula (4).

When the base polymer is polyalkoxy endstopped there is no need to require that alkoxy-functional groups be bonded to any of the silicon atoms. On the other hand, when the base polymer is only monoalkoxy endstopped, it is preferred that the scavenger have alkoxy-functional groups or a crosslinking silane of formula (4) be included.

The general concept and chemistry of such cyclic scavengers is the same as discussed hereinabove for scavengers of formulas (1) and (2). Accordingly, the artisan should be capable of preparing and utilizing a cyclic scavenger or scavenger/crosslinker without further explanation.

In determining what level of scavenger to use in the RTV compositions of the present invention, the total hydroxy-functionality of the RTV composition can be estimated by infrared analysis. In order to insure that an effective or stabilizing amount of scavenger is used to maintain the stability of the composition over an extended shelf period of six months or more at ambient temperature while in a sealed container, there can be used an additional amount of scavenger over that required to endstop the polymer. This excess of scavenger can be up to about 3% by weight, based on the weight of the polymer. The 3% by weight scavenger exceeds the amount required to substantially eliminate available hydroxy-functionality in the polymer as a result of reaction between OH functionality and X radicals. In compositions which also contain filler and other additives, the additional amount of scavenger which is required is estimated by running a 48 hour stability check at 100° C. to determine whether the tack-free time remains substantially unchanged as compared to the tack-free time of the composition before aging measured under substantially the same conditions.

The term "stable" as used herein with respect to one package RTV compositions means capable of remaining substantially unchanged while excluded from atmospheric moisture and which cures to a tack-free elastomer after an extended shelf period. In addition, a stable RTV also means that the tack-free time exhibited by freshly mixed RTV ingredients under atmospheric conditions will be substantially the same as that exhibited by the same mixture of ingredients exposed to atmospheric moisture after having been held in a moisture resistant and moisture-free container for an extended shelf period at ambient conditions, or an equivalent period based on accelerated aging at an elevated temperature.

The most preferred base polymer of the present invention is a polyalkoxy-terminated organopolysiloxane having the formula

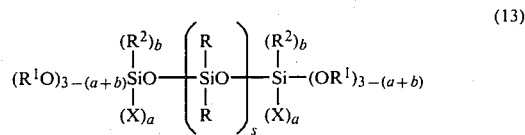
(13)

where R, $R^1$, X and n are as previously defined; where $R^2$ is as previously defined or Y; a equals 0 or 1; b equals 0 or 1 and the sum of a+b is equal to 0 or 1. In the polyalkoxy-terminated organopolysiloxane, and hence in the foregoing formulas, R is preferably selected from $C_{(1-13)}$ monovalent hydrocarbon radicals, halogenated hydrocarbon radicals and cyanoalkyl radicals; $R^1$, $R^3$ and $R^4$ are preferably $C_{(1-8)}$ alkyl radicals or a $C_{(7-13)}$ aralkyl radical, $R^2$, $R^5$ and $R^6$ are preferably methyl, phenyl, or vinyl.

Thus there is provided by the present invention, a one package, substantially anhydrous, room temperature vulcanizable organopolysiloxane composition stable under ambient conditions in the substantial absence of moisture over an extended period of time and convertible to a substantially acid free, tack-free elastomer comprising (1) an organopolysiloxane wherein the silicon atom at each polymer chain end is terminated with at least two alkoxy radicals, (2) an effective amount of condensation catalyst and (3) a stabilizing amount of scavenging silane of the formula

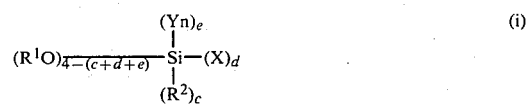
(i)

where $R^1$, $R^2$ and X are as previously defined, c is an integer equal to 0 to 2, d is an integer equal to 1 to 3, e is an integer equal to 1 to 3, the sum of c+d+e equals 2 to 4, and n equals an integer equal to or greater than 1; or

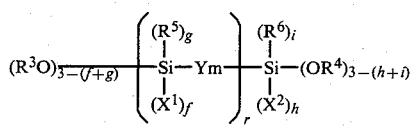

where $R^3$, $R^4$, $R^5$, $R^6$, $X^1$, $X^2$ and Y are as previously defined; f is an integer equal to 0 to 3; g is an integer equal to 0 to 3; h is an integer equal to 0 to 3; i is an integer equal to 0 to 3; the sum of $f+g$ equals 0 to 3; the sum of $h+i$ equals 0 to 3; $h+f$ equals at least 1; m is equal to 0 or more; and r is equal to at least 1; or (iii) mixtures thereof. In addition, an effective amount of curing accelerator selected from substituted guanidines, amines and mixtures thereof is used.

In a further aspect of the invention there is provided a stable room temperature vulcanizable polyalkoxy-terminated organopolysiloxane composition curable under ambient conditions to a tack-free, substantially acid-free elastomer comprising:

(A) 100 parts of a polyalkoxy-terminated organopolysiloxane of formula (13);
(B) 0–10 parts of a crosslinking silane of formula (4);
(C) an effective amount of condensation catalyst; and
(D) a stabilizing amount of a scavenging composition.

Also included within the scope of the present invention is a method of making a room temperature vulcanizable organopolysiloxane composition under substantially anhydrous conditions utilizing an effective amount of a condensation catalyst with a silanol-terminated organopolysiloxane and a polysiloxane crosslinking agent, the improvement which comprises adding a composition which is both a scavenger for hydroxy functional groups and a crosslinking agent of the formula

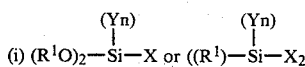

where $R^1$, X, Y and n are as previously defined,

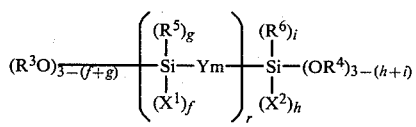

where $R^3$, $R^4$, $R^5$, $R^6$, $X^1$, $X^2$, Y, m and r are as previously defined; where there are at least three hydrolyzable radicals selected from $(OR^3)_{3-(f+g)}$, $(OR^4)_{3-(h+i)}$, $X^1$ and $X^2$ when Y is not hydrolyzable; and where there are at least two hydrolyzable radicals selected from $(OR^3)_{3-(f+g)}$, $(OR^4)_{3-(h+i)}$, $X^1$ or $X^2$ and Y when Y is hydrolyzable such that at least one hydrolysis product has 3 or more hydrolyzable groups bonded thereto; or (iii) a cyclic compound with at least one silicon atom as a member of the ring, said silicon atom having attached thereto a hydrolyzable leaving group selected from the group consisting of amido, amino, carbamato, enoxy, imidato, isocyanato, oximato, thioisocyahato and ureido radicals.

In an additional aspect of the present invention there is provided a method of making a stable, one package room temperature vulcanizable polyalkoxy-terminated organopolysiloxane composition which comprises agitating, under substantially anhydrous conditions, a room temperature vulcanizing material selected from (1) a mixture comprising on a weight basis
   (a) 100 parts of a silanol-terminated polydiorganosiloxane of formula (3);
   (b) an amount of composition of formula (1) or of formula (2) having at least two hydrolyzable groups or mixtures thereof, sufficient to scavenge available —OH in the RTV composition and provide up to 3% by weight excess, based on the weight of RTV composition;
   (c) 0 to 10 parts of crosslinking silane of formula (4);
   (d) an effective amount of condensation catalyst; and
   (e) 0 to 5 parts curing accelerator selected from substituted guanidines, amines and mixtures thereof, wherein the condensation catalyst is added after the silanol-terminated polydiorganosiloxane and scavenging silane are mixed; and (ii) a mixture comprising:
   (a) 100 parts of the polyalkoxy-terminated organopolysiloxane of formula (13);
   (b) 0 to 10 parts of cross-linking silane of formula (4);
   (c) an effective amount of condensation catalyst;
   (d) a stabilizing amount of a composition of formula (1a) or (2a) or mixtures thereof; and
   (e) 0 to 5 parts of curing accelerator selected from substituted guanidines, amines and mixtures thereof.

The expression "substantially acid free" with respect to defining the elastomer made from the RTV composition of the present invention upon exposure to atmospheric moisture means yielding by-products having a pKa of 5.5 or greater, 6 or greater being preferred, and 10 or more being particularly preferred.

Various fillers and pigments can be incorporated in the silanol or alkoxy-terminated organopolysiloxane, such as, for example, titanium dioxide, zirconium silicate, silica areogel, iron oxide, diatomaceous earth, fumed silica, carbon black, precipitated silica, glass fibers, polyvinylchloride, ground quartz, calcium carbonate and the like. The amounts of fillers used can be varied within wide limits in accordance with the intended use. For example, in some sealant applications the curable compositions of the present invention can be used free of filler. In other applications, such as utilizing curable compositions for making binding material, on a weight basis, as much as 700 parts or more of filler per 100 parts of organopolysiloxane can be employed. In such applications, the filler can consist of a major amount of extending materials, such as ground quartz, polyvinylchloride, or mixtures thereof, preferably having an average particle size in the range of from about 1 to 10 microns.

The compositions of the present invention also can be employed as construction sealants and caulking compounds. The exact amount of filler, therefore, wll depend upon such factors as the application for which the organopolysiloxane composition is intended and the type of filler utilized, that is, the density of the filler and its particle size. Preferably a proportion of from 10 to 300 parts of filler, which can include up to about 35 parts of reinforcing filler, such as fumed silica, per 100 parts of silanol-terminated organopolysiloxane is utilized.

EXAMPLES

In order that those skilled in the art might be better able to practice the present invention, the following examples are given by way of illustration and not by way of limitation. All parts are by weight unless otherwise noted.

EXAMPLES 1-3

A mixer equipped with a vacuum line and nitrogen purge was charged with 100 parts of alkoxy endstopped polydimethylsiloxane polymer having a viscosity of 120,000 centipoise at 25° C. To this polymer there was added 17 parts of cyclooctamethyltetrasiloxane ($D_4$) treated fumed silica filler, 35 parts of a silanol containing dimethylsilicone fluid, 15 parts of a silanol containing "MDT" dimethylsilicone fluid, and 0.2 parts of a thixotropic agent. This mixture was agitated under vacuum (20 mm Hg at 25° C.) for two hours to provide an RTV base composition.

To three samples of 100 parts of the RTV base composition there was added 1, 2 and 3 parts, respectively of

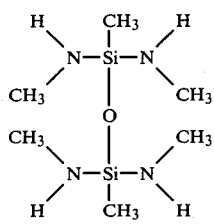

as a scavenger, followed by 15 minutes agitation with a Sem Kit ® mixer. During a second 15 minute mixing step there was added to each sample 1 part 3-(2-aminoethylamine)propyltrimethoxysilane, 0.5 parts trimethoxysilane and 0.10 parts of dibutyltindiacetate.

Following the second mixing, the three RTV compositions were each divided into two portions and placed in separate sealed aluminum tubes. One portion of each RTV composition was stored for 24 hours at room temperature and the other stored for 48 hours at 100° C. After the storage period, the composition was extruded into Teflon ® molds and knifed to form ASTM sheets of 4 inches by 5 inches by 0.063 inches thickness. The sheets were allowed to cure for 5 days at room temperature and 50% relative humidity. Durometer (Shore A), tensile strength, % elongation and modulus 50% and 100% extension were then measured according to WPSTM E-3/E-1. The results are set forth in Table I.

TABLE I

|  | Room Temp | 48 hrs/100° C. |
|---|---|---|
| Example 1 (1 part scavenger) | | |
| TFT (min) | 35 | 15 |
| Shore A | 20 | 18 |
| Tensile (psi) | 215 | 186 |
| Elongation (%) | 394 | 358 |
| Example 2 (2 parts scavenger) | | |
| TFT (min) | 10 | 10 |
| Shore A | 22 | 21 |
| Tensile (psi) | 204 | 188 |
| Elongation (%) | 337 | 326 |
| Example 3 (3 parts scavenger) | | |
| TFT (min) | 35 | 20 |
| Shore A | 20 | 17 |
| Tensile (psi) | 209 | 157 |
| Elongation (%) | 465 | 386 |

The results of these accelerated aging tests show that inclusion of the scavengers in the room temperature vulcanizable compositions provides improved shelf life, as in the absence of a scavenger little if any cure occurs after aging for 48 hours at 100° C.

EXAMPLE 4

In this example, the same procedure was followed as in Examples 1 through 3, except the $[MeSi(NHMe)_2]_2O$ scavenger was replaced with pentamethylmethylaminodisilane

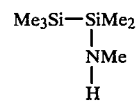

The results for a single sample utilizing 2 parts of scavenger are set forth in Table II.

TABLE II

| | Example 4 (2 parts scavenger) | |
|---|---|---|
| | Room Temp | 48 hrs/100° C. |
| TFT (min) | 20 | 40 |
| Shore A | 17 | 14 |
| Tensile (psi) | 184 | 157 |
| Elongation (%) | 631 | 652 |

This example shows that the scavenger utilized in this experiment also provides RTV compositions having satisfactory shelf life.

EXAMPLE 5

In this example the procedure set forth in Examples 1 through 3 was again followed, except the $[MeSi(NHMe)_2]_2O$ scavenger was replaced with a silylated ethylene glycol scavenger having the formula:

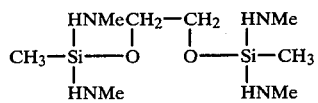

The results for a single sample having 2 parts of scavenger are shown in Table III.

TABLE III

| | Example 4 (2 parts scavenger) | |
|---|---|---|
| | Room Temp | 48 hrs/100° C. |
| TFT (min) | 35 | 45 |
| Shore A | 18 | 16 |
| Tensile (psi) | 241 | 194 |
| Elongation (%) | 581 | 534 |

This example further illustrates that the scavengers of the present invention are useful for providing RTV compositions having satisfactory shelf life.

EXAMPLES 6 AND 7

The procedure set forth in Examples 1 through 3 was followed, however, the scavenger utilized had the formula

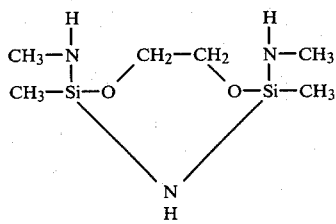

The results of compositions having 1 part and 2 parts of scavenger are illustrated in Table IV.

TABLE IV

|  | Room Temperature | 48/hrs/100° C. |
| --- | --- | --- |
| *Example 6 (1 part scavenger)* | | |
| TFT (min) | 35 | 60 |
| Shore A | 16 | 12 |
| Tensile (psi) | 234 | 181 |
| Elongation (%) | 631 | 675 |
| *Example 7 (2 parts scavenger)* | | |
| TFT (min) | 180 | 120 |
| Shore A | 14 | 13 |
| Tensile (psi) | 192 | 172 |
| Elongation (%) | 604 | 584 |

This example illustrates the use of a cyclic compound as a scavenger to provide RTV compositions having satisfactory shelf life.

I claim:

1. A stable, one package, substantially anhydrous and substantially acid-free room temperature vulcanizable organopolysiloxane composition stable under ambient conditions in the substantial absence of moisture over an extended period of time and convertible to a tack-free elastomer comprising:

(A) a silanol-terminated organosiloxane base polymer;

(B) an effective amount of condensation catalyst;

(C) a stabilizing amount of scavenger for hydroxy functional groups having the general formula

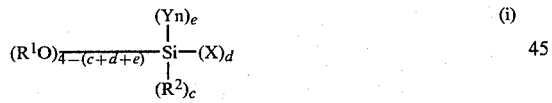

where $R^1$ is an aliphatic radical having 1 to 8 carbon atoms and is selected from the group consisting of alkyl radicals, alkylether radicals, alkylester radicals, alkylketone radicals and alkylcyano radicals or an aralkyl radical having 7 to 13 carbon atoms; $R^2$ is a monovalent substituted or unsubstituted hydrocarbon radical having 1 to 13 carbon atoms; X is a hydrolyzable leaving group selected from the group consisting of amido, amino, carbamato, enoxy, imidato, isocyanato, oximato, thioisocyanato and ureido radicals; Y is selected from the group consisting of moieties of Si, O, S, N, P, C, B, Sn, Pb, Ca, hydrazine, azo radicals, CO, $CO_2$, organic peroxides and metal oxides of the formula $AO_z$ where A is selected from the group consisting of B, S, Sn, P, Al, Ti, V, Tl, Ir, Pb, Pt, Pd and Fe and where z is sufficient to satisfy chemical valence requirements; where C is attached to at least one other Y moiety; c is an integer equal to 0 to 1; d is an integer equal to 1 or 2; e is an integer equal to 1 or 2; the sum of c+d+e equals 2 or 3; n equals at least 1; or

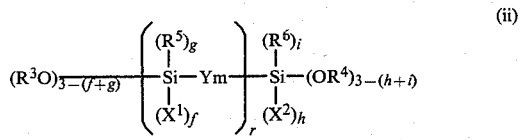

where $R^3$ and $R^4$ are aliphatic radicals having 1 to 8 carbon atoms and are selected from the group consisting of alkyl radicals, alkylether radials, alkylester radicals, alkylketone radicals and alkylcyano radicals or an aralkyl radical having 7 to 13 carbon atoms; $R^5$ and $R^6$ are monovalent substituted or unsubstituted hydrocarbon radicals having 1 to 13 carbon atoms or Yn; Y is selected from the group consisting of moieties of Si, O, S, N, P, C, B, Sn, Pb, Ca, hydrazine, azo radicals, CO, $CO_2$, organic peroxides and metal oxides of the formula $AO_z$ where A is selected from the group consisting of B, S, Sn, P, Al, Ti, V, Tl, Ir, Pb, Pt, Pd and Fe, and z is sufficient to satisfy chemical valence requirements; $X^1$ and $X^2$ are hydrolyzable leaving groups selected from the group consisting of amido, amino, carbamato, enoxy, imidato, isocyanato, oximato, thioisocyanato and ureido radicals; f is an integer equal to 0 to 2 inclusive; g is an integer equal to 0 to 2 inclusive; h is an integer equal to 0 to 3 inclusive; i is an integer equal to 0 to 3 inclusive; the sum of f+g equals 0 to 2 inclusive; the sum of h+f equals at least 1; the sum of h+i equals 0 to 3 inclusive; m is equal to 0 or more and r is equal to at least 1; or (iii) a cyclic compound with at least one silicon atom as a member of the ring, said silicon atom having attached thereto a hydrolyzable leaving group selected from the group consisting of amido, amino, carbamato, enoxy, imidato, isocyanato, oximato, thioisocyanato and ureido radicals; and wherein at least 1 of said silicon atoms has attached thereto an alkoxy radical having an aliphatic group of 1 to 8 carbon atoms selected from the group consisting of alkyl radicals, alkylether radicals, alkylester radicals, alkylketone radicals, and alkylcyano radicals or an aralkyl radical having 7 to 13 carbon atoms, and wherein the total number of hydrolyzable groups is at least three, or (iv) mixtures of (i) and (ii) and (iii); and where the hydrolyzable group is enoxy (D) an effective amount of curing accelerator selected from the group consisting of substituted guanidines, amines and mixtures thereof.

2. A stable, one package, substantially anhydrous and substantially acid free room temperature vulcanizable organopolysiloxane composition stable under ambient conditions in the substantial absence of moisture over an extended period of time and convertible to a tack-free elastomer comprising:

(A) an alkoxy-terminated organosiloxane base polymer;

(B) an effective amount of condensation catalyst;

(C) a stabilizing amount of scavenger for hydroxy functional groups having the general formula

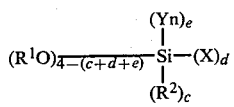 (i)

where $R^1$ is an aliphatic radical having 1 to 8 carbon atoms and is selected from the group consisting of alkyl radicals, alkylether radicals, alkylester radicals, alkylketone radicals and alkylcyano radicals or an aralkyl radical having 7 to 13 carbon atoms; $R^2$ is a monovalent substituted or unsubstituted hydrocarbon radical having 1 to 13 carbon atoms; X is a hydrolyzable leaving group selected from the group consisting of amido, amino, carbamato, enoxy, imidato, isocyanato, oximato, thioisocyanato and ureido radicals; Y is selected from the group consisting of moieties of Si, O, S, N, P, C, B, Sn, Pb, Ca, hydrazine, azo radicals, CO, $CO_2$, organic peroxides and metal oxides of the formula $AO_z$ where A is selected from the group consisting of B, S, Sn, P, Al, Ti, V, Tl, Ir, Pb, Pt, Pd and Fe and where z is sufficient to satisfy chemical valence requirements; where C is attached to at least one other Y moiety; c is an integer equal to 0 to 2; d is an integer equal to 1 to 3; e is an integer equal to 1 to 3; the sum of c+d+e equals 2 to 4; n equals at least 1; or

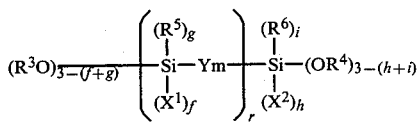 (ii)

where $R^3$ and $R^4$ are aliphatic radicals having 1 to 8 carbon atoms and are selected from the group consisting of alkyl radicals, alkylether radials, alkylester radicals, alkylketone radicals and alkylcyano radicals or an aralkyl radical having 7 to 13 carbon atoms; $R^5$ and $R^6$ are monovalent substituted or unsubstituted hydrocarbon radicals having 1 to 13 carbon atoms or Yn; Y is selected from the group consisting of moieties of Si, O, S, N, P, C, B, Sn, Pb, Ca, hydrazine, azo radicals, CO, $CO_2$, organic peroxides and metal oxides of the formula $AO_z$ where A is selected from the group consisting of B, S, Sn, P, Al, Ti, V, Tl, Ir, Pb, Pt, Pd and Fe, and z is sufficient to satisfy chemical valence requirements; $X^1$ and $X^2$ are hydrolyzable leaving groups selected from the group consisting of amido, amino, carbamato, enoxy, imidato, isocyanato, oximato, thioisocyanato and ureido radicals; f is an integer equal to 0 to 3 inclusive; g is an integer equal to 0 to 3 inclusive; h is an integer equal to 0 to 3 inclusive; i is an integer equal to 0 to 3 inclusive; the sum of f+g equals 0 to 3 inclusive; the sum of h+f equals at least 1; the sum of h+i equals at 0 to 3 inclusive; m is equal to 0 or more and r is equal to at least 1; or (iii) a cyclic compound with at least one silicon atom as a member of the ring, said silicon atom having attached thereto a hydrolyzable leaving group selected from the group consisting of amido, amino, carbamato, enoxy, imidato, isocyanato, oximato, thioisocyanato and ureido radicals; or (iv) mixtures of (i) and (ii) and (iii).

3. The composition of claim 1 wherein ingredient (C) functions as both a scavenger for hydroxy functional groups and as a crosslinking agent and has the general formula:

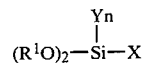 (i)

or

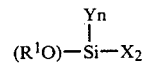 (ii)

where $R^1$ an aliphatic radical having 1 to 8 carbon atoms and is selected from the group consisting of alkyl radicals, alkylether radicals, alkylester radicals, alkylketone radicals and alkylcyano radicals or an aralkyl radical having 7 to 13 carbon atoms; $R^2$ is a monovalent substituted or unsubstituted hydrocarbon radical having 1 to 13 carbon atoms; X is a hydrolyzable leaving group selected from the group consisting of amido, amino, carbamato, enoxy, imidato, isocyanato, oximato, thioisocyanato and ureido radicals; and Y is selected from the group consisting of moieties of Si, O, S, N, P, C, B, Sn, Pb, Ca, hydrazine, azo radicals, CO, $CO_2$, organic peroxides and metal oxides of the formula $AO_z$ where A is selected from the group consisting of B, S, Sn, P, Al, Ti, V, Tl, Ir, Pb, Pt, Pd and Fe and where z is sufficient to satisfy chemical valence requirements; where C is attached to at least one other Y moiety; and where n equals at least 1; or

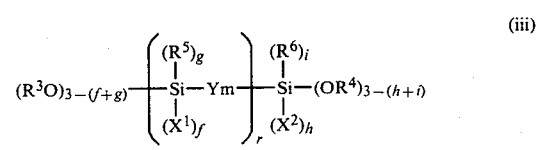 (iii)

where $R^3$ and $R^4$ are aliphatic radicals having 1 to 8 carbon atoms and are selected from the group consisting of alkyl radicals, alkylether radials, alkylester radicals, alkylketone radicals and alkylcyano radicals or an aralkyl radical having 7 to 13 carbon atoms; $R^5$ and $R^6$ are monovalent substituted or unsubstituted hydrocarbon radicals having 1 to 13 carbon atoms or Yn; Y is selected from the group consisting of moieties of Si, O, S, N, P, C, B, Sn, Pb, Ca, hydrazine, azo radicals, CO, $CO_2$, organic peroxides and metal oxides of the formula $AO_z$ where A is selected from the group consisting of B, S, Sn, P, Al, Ti, V, Tl, Ir, Pb, Pt, Pd and Fe, and z is sufficient to satisfy chemical valence requirements; $X^1$ and $X^2$ are hydrolyzable leaving groups selected from the group consisting of amido, amino, carbamato, enoxy, imidato, isocyanato, oximato, thioisocyanato and ureido radicals; and where Y is not hydrolyzable, f is an integer equal to 0 to 2; g is an integer equal to 0 to 2 inclusive; h is an integer equal to 0 to 2; i is an integer equal to 0 to 2, and f+h+[3−(f+g)]+[3−(h+i)] equals at least 3; and where Y is hydrolyzable, f is an integer equal to 0 to 2, g is an integer equal to 0 to 2, h is an integer equal to 0 to 2, i is an integer equal to 0 to 2, and f+[3−(f+g)] equals at least 2 or h+[3−(h+i)] equals at least 2; m equals 1 or more and r equals at least 1; or (iv) a cyclic compound with at least three silicon atoms as members of the ring wherein at least one of said silicon atoms has attached thereto a hydrolyzable leaving group selected from the group consisting of amido, amino, carbamato, enoxy, imidato, isocyanato, oximato, thioisocyanato and ureido radicals, and wherein at least one of said silicon atoms has attached thereto an alkoxy radical having an aliphatic group of 1 to 8 carbon atoms selected from the group consisting of alkyl radicals, alkylether radicals, alkylester radicals, alkylketone radicals and alkylcyano radicals or an aralkyl radical having 7 to 13 carbon atoms, and wherein the total number of alkoxy plus hydrolyzable radicals equals 3 or more;

(v) mixtures of (i), (ii), (iii), and (iv).

4. The composition of claim 2 wherein ingredient (C) functions as both a scavenger for hydroxy functional groups and as a crosslinking agent and has the general formula:

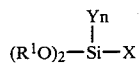  (i)

or

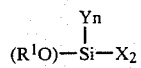  (ii)

or

  (iii)

where $R^1$ an aliphatic radical having 1 to 8 carbon atoms and is selected from the group consisting of alkyl radicals, alkylether radicals, alkylester radicals, alkylketone radicals and alkylcyano radicals or an aralkyl radical having 7 to 13 carbon atoms; $R^2$ is a monovalent substituted or unsubstituted hydrocarbon radical having 1 to 13 carbon atoms; X is a hydrolyzable leaving group selected from the group consisting of amido, amino, carbamato, enoxy, imidato, isocyanato, oximato, thioisocyanato and ureido radicals; and Y is selected from the group consisting of moieties of Si, O, S, N, P, C, B, Sn, Pb, Ca, hydrazine, azo radicals, CO, $CO_2$, organic peroxides and metal oxides of the formula $AO_z$ where A is selected from the group consisting of B, S, Sn, P, Al, Ti, V, Tl, Ir, Pb, Pt, Pd and Fe and where z is sufficient to satisfy chemical valence requirements; where C is attached to at least one other Y moiety; and where n equals at least 1; or

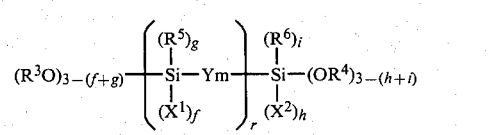  (iv)

where $R^3$ and $R^4$ are aliphatic radicals having 1 to 8 carbon atoms and are selected from the group consisting of alkyl radicals, alkylether radials, alkylester radicals, alkylketone radicals and alkylcyano radicals or an aralkyl radical having 7 to 13 carbon atoms; $R^5$ and $R^6$ are monovalent substituted or unsubstituted hydrocarbon radicals having 1 to 13 carbon atoms or Yn; Y is selected from the group consisting of moieties of Si, O, S, N, P, C, B, Sn, Pb, Ca, hydrazine, azo radicals, CO, $CO_2$, organic peroxides and metal oxides of the formula $AO_z$ where A is selected from the group consisting of B, S, Sn, P, Al, Ti, V, Tl, Ir, Pb, Pt, Pd and Fe, and z is sufficient to satisfy chemical valence requirements; $X^1$ and $X^2$ are hydrolyzable leaving groups selected from the group consisting of amido, amino, carbamato, enoxy, imidato, isocyanato, oximato, thioisocyanato and ureido radicals; and where Y is not hydrolyzable, f is an integer equal to 0 to 3; g is an integer equal to 0 to 3 inclusive; h is an integer equal to 0 to 2; i is an integer equal to 0 to 2, f+h equals at least 1, and f+h+[3−(f+g)]+[3−(h+i)] equals at least 3; and where Y is hydrolyzable, f is an integer equal to 0 to 3, g is an integer equal to 0 to 3, h is an integer equal to 0 to 3, i is an integer equal to 0 to 3, f+h equals at least 1, and f+[3−(f+g)] equals at least 2 or h+[3−(h+i)] equals at least 2; n equals 1 or more and r equals at least 1; or (v) a cyclic compound with at least three silicon atoms as members of the ring wherein at least one of said silicon atoms has attached thereto a hydrolyzable leaving group selected from the group consisting of amino, amido, carbamato, enoxy, imidato, isocyanato, oximato, thioisocyanato and ureido radicals, and wherein zero or more of said silicon atoms has attached thereto an alkoxy radical having an aliphatic group of 1 to 8 carbon atoms selected from the group consisting of alkyl radicals, alkylketone radicals, alkylcyano radicals or an aralkyl radical having 7 to 13 carbon atoms;

(vi) mixtures of (i), (ii), (iii), (iv) and (v).

5. The composition of claim 1 wherein the hydrolyzable group of ingredient (C) is selected from the group consisting of amido, amino, carbamato, imidato, isocyanato, oximato, thioisocyanato and ureido radicals, further comprising an effective amount of curing accelerator selected from the group consisting of substituted guanidines, amines and mixtures thereof.

6. The composition of claim 2 wherein the hydrolyzable group of ingredient (C) is selected from the group consisting of amido, amino, carbamato, enoxy, imidato, isocyanato, oximato, thioisocyanato and ureido radicals, further comprising an effective amount of curing accelerator selected from the group consisting of substituted guanidines, amines and mixtures thereof.

7. The composition of claim 3 wherein the hydrolyzable group of ingredient (C) is selected from the group consisting of amido, amino, carbamato, imidato, isocyanato, oximato, thioisocyanato and ureido radicals, further comprising an effective amount of curing accelerator selected from the group consisting of substituted guanidines, amines and mixtures thereof.

8. The composition of claim 4 wherein the hydrolyzable group of ingredient (C) is selected from the group consisting of amido, amino, carbamato, enoxy, imidato, isocyanato, oximato, thioisocyanato and ureido radicals, further comprising an effective amount of curing accelerator selected from the group consisting of substituted guanidines, amines and mixtures thereof.

9. The composition of claim 1 having an effective amount of a crosslinking silane of the formula

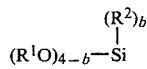

where $R^1$ is an aliphatic radical having from 1 to 8 carbon atoms and is selected from the group consisting of alkyl radicals, alkylether radicals, alkylester radicals, alkylketone radicals and alkylcyano radicals or an aralkyl radical having 7 to 13 carbon atoms; $R^2$ is a monovalent substituted or unsubstituted hydrocarbon radical having 1 to 13 carbon atoms and b is a whole number equal to 0 or 1.

10. The composition of claim 2 having an effective amount of a crosslinking silane of the formula

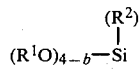

where $R^1$ is an aliphatic radical having from 1 to 8 carbon atoms and is selected from the group consisting of alkyl radicals, alkylether radicals, alkylester radicals, alkylketone radicals and alkylcyano radicals or an aralkyl radical having 7 to 13 carbon atoms; $R^2$ is a monovalent substituted or unsubstituted hydrocarbon radical having 1 to 13 carbon atoms and b is a whole number equal to 0 or 1.

11. The composition of claim 3 having an effective amount of a crosslinking silane of the formula

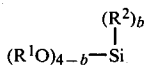

where $R^1$ is an aliphatic radical having from 1 to 8 carbon atoms and is selected from the group consisting of alkyl radicals, alkylether radicals, alkylester radicals, alkylketone radicals and alkylcyano radicals or an aralkyl radical having 7 to 13 carbon atoms; $R^2$ is a monovalent substituted or unsubstituted hydrocarbon radical having 1 to 13 carbon atoms and b is a whole number equal to 0 or 1.

12. The composition of claim 4 having an effective amount of a crosslinking silane of the formula

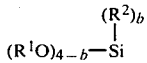

where $R^1$ is an aliphatic radical having from 1 to 8 carbon atoms and is selected from the group consisting of alkyl radicals, alkylether radicals, alkylester radicals, alkylketone radicals and alkylcyano radicals or an aralkyl radical having 7 to 13 carbon atoms; $R^2$ is a monovalent substituted or unsubstituted hydrocarbon radical having 1 to 13 carbon atoms and b is a whole number equal to 0 or 1.

13. The composition of claim 2 wherein the alkoxy terminated base polymer has the formula

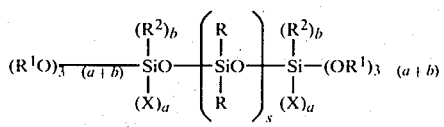

where R is a monovalent substituted or unsubstituted hydrocarbon radical having 1 to 13 carbon atoms, $R^1$ is an aliphatic organic radical having 1 to 8 carbon atoms selected from the group consisting of alkyl, alkylether, alkylester, alkylketone and alkylcyano radicals or an aralkyl radical having 7 to 13 carbon atoms; $R^2$ is a monovalent substituted or unsubstituted hydrocarbon radical having 1 to 13 carbon atoms; X is a hydrolyzable leaving group selected from the group consisting of amido, amino, carbamato, enoxy, imidato, isocyanato, oximato, thioisocyanato and ureido radicals and a is a whole number equal to 0 or 1 and the sum of a+b equals 0 or 1, and s is an integer having a value of from about 50 to 2500.

14. The composition of claim 4 wherein the alkoxy terminated base polymer has the formula

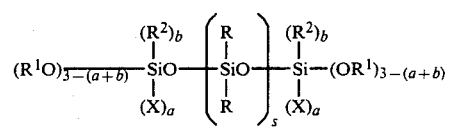

where R is a monovalent substituted or unsubstituted hydrocarbon radical having 1 to 13 carbon atoms, $R^1$ is an aliphatic organic radical having 1 to 8 carbon atoms selected from the group consisting of alkyl, alkylether, alkylester, alkylketone and alkylcyano radicals or an aralkyl radical having 7 to 13 carbon atoms; $R^2$ is a monovalent substituted or unsubstituted hydrocarbon radical having 1 to 13 carbon atoms; X is a hydrolyzable leaving group selected from the group consisting of amido, amino, carbamato, enoxy, imidato, isocyanato, oximato, thioisocyanato and ureido radicals and a is a whole number equal to 0 or 1 and the sum of a+b equals 0 or 1, and s is an integer having a value of from about 50 to 2500.

15. The composition of claim 2 wherein the alkoxy terminated base polymer has the formula

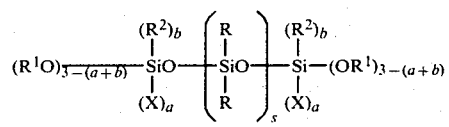

where R is a monovalent substituted or unsubstituted hydrocarbon radical having 1 to 13 carbon atoms, $R^1$ is an aliphatic organic radical having 1 to 8 carbon atoms selected from the group consisting of alkyl, alkylether, alkylester, alkylketone and alkylcyano radicals or an aralkyl radical having 7 to 13 carbon atoms; $R^2$ is a monovalent substituted or unsubstituted hydrocarbon radical having 1 to 13 carbon atoms; x is a hydrolyzable leaving group selected from the group consisting of amido, amino, carbamato, enoxy, imidato, isocyanato, oximato, thioisocyanato and ureido radicals; a is a whole number equal to 0 to 2, b is a whole number equal to 0 to 2 and the sum of a+b equals 2, s is an integer having a value of from about 50 to 2500; and where b equals 2, a crosslinking silane of the formula

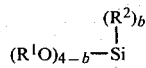

where $R^1$ where $R^1$ is an aliphatic radical having from 1 to 8 carbon atoms and is selected from the group consisting of alkyl radicals, alkylether radicals, alkylester radicals, alkylketone radicals and alkylcyano radicals or an aralkyl radical having 7 to 13 carbon atoms; $R^2$ is a monovalent substituted or unsubstituted hydrocarbon radical having 1 to 13 carbon atoms and b is a whole number equal to 0 or 1.

16. The composition of claim 4 wherein the alkoxy terminated base polymer has the formula

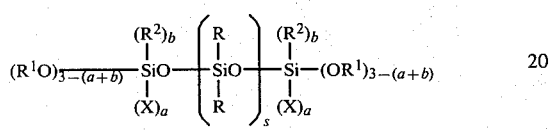

where R is a monovalent substituted or unsubstituted hydrocarbon radical having 1 to 13 carbon atoms, $R^1$ is an aliphatic organic radical having 1 to 8 carbon atoms selected from the group consisting of alkyl, alkylether, alkylester, alkylketone and alkylcyano radicals or an aralkyl radical having 7 to 13 carbon atoms; $R^2$ is a monovalent substituted or unsubstituted hydrocarbon radical having 1 to 13 carbon atoms; X is a hydrolyzable leaving group selected from the group consisting of amido, amino, carbamato, enoxy, imidato, isocyanato, oximato, thioisocyanato and ureido radicals and a is a whole number equal to 0 to 2, b is a whole number equal to 0 to 2 and the sum of a+b equals 2, and s is an integer having a value of up to about 2500.

17. The composition of claim 15 wherein the scavenger for hydroxy functional groups has the general formula

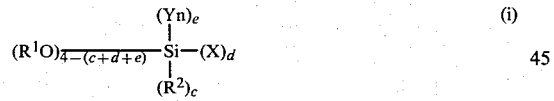

where $R^1$ is an aliphatic radical having from 1 to 8 carbon atoms and is selected from the group consisting of alkyl radicals, alkylether radicals, alkylester radicals, alkylketone radicals and alkylcyano radicals or an aralkyl radical having from 7 to 13 carbon atoms; $R^2$ is a monovalent substituted or unsubstituted hydrocarbon radical having 1 to 13 carbon atoms; X is a hydrolyzable leaving X is a hydrolyzable leaving group selected from the group consisting of amido, amino, carbamato, enoxy, imidato, isocyanato, oximato, thioisocyanato and ureido radicals; Y is selected from the group consisting of moieties of Si, O, S, N, P, C, B, Sn, Pb, Ca, hydrazine, azo radicals, CO, $CO_2$, organic peroxides and metal oxides of the formula $AO_z$ where A is selected from the group consisting of B, S, Sn, P, Al, Ti, V, Tl, Ir, Pb, Pt, Pd and Fe and where z is sufficient to satisfy chemical valence requirements; where C is attached to at least one other Y moiety; c is an integer equal to 0 to 2 inclusive; d is an integer equal to 1 or 2; e is an integer equal to 1 to 3 inclusive; the sum of d+[4−(c+d+e)] equals 1 or 2, n equals at least 1; or

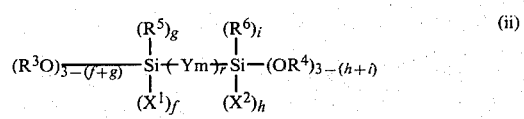

where $R^3$ and $R^4$ are aliphatic radicals having 1 to 8 carbon atoms and are selected from the group consisting of alkyl radicals, alkylether radials, alkylester radicals, alkylketone radicals and alkylcyano radicals or an aralkyl radical having 7 to 13 carbon atoms; $R^5$ and $R^6$ are monovalent substituted or unsubstituted hydrocarbon radicals having 1 to 13 carbon atoms or Yn; Y is selected from the group consisting of moieties of Si, O, S, N, P, C, B, Sn, Pb, Ca, hydrazine, azo radicals, CO, $CO_2$, organic peroxides and metal oxides of the formula $AO_z$ where A is selected from the group consisting of B, S, Sn, P, Al, Ti, V, Tl, Ir, Pb, Pt, Pd and Fe, and z is sufficient to satisfy chemical valence requirements; $X^1$ and $X^2$ are hydrolyzable leaving groups selected from the group consisting of amido, amino, carbamato, enoxy, imidato, isocyanato, oximato, thioisocyanato and ureido radicals; and where Ym is not hydrolyzable, f is an integer equal to 0 to 3; g is an integer equal to 0 to 3; h is an integer equal to 0 to 3; i is an integer equal to 0 to 2 and f+h+[3−(f+g)]+[3−(h+i)] equals 1 or 2, and f+h equals at least 1; and where Ym is hydrolyzable, f is an integer equal to 0 or 3, g is an integer equal to 0 to 3, h is an integer equal to 0 to 3, i is an integer equal to 0 to 3 and f+[3−(f+g)] equals 0 or 1, h+[3−(h+i)] equals 0 or 1, f+h equals 1 or 2; and the total number of hydrolyzable, excluding Ym, groups does not exceed 2;

(iii) a cyclic compound with at least three silicon atoms as members of the ring wherein at least one of said silicon atoms has attached thereto a hydrolyzable leaving group selected from the group consisting of amido, amino, carbamato, enoxy, imidato, isocyanato, oximato, thioisocyanato and ureido radicals, and wherein at least one of said silicon atoms has attached thereto an alkoxy radical having an aliphatic group of 1 to 8 carbon atoms selected from the group consisting of alkyl radicals, alkylether radicals, alkylester radicals, alkylketone radicals and alkylcyano radicals or an aralkyl radical having 7 to 13 carbon atoms, and wherein the total number of alkoxy plus hydrolyzable radicals equals 3 or more;

(iv) mixtures of (i), (ii) and (iii);

further comprising an effective amount of a crosslinking silane of the formula

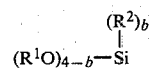

where $R^1$ is an aliphatic radical having 1 to 8 carbon atoms and is selected from the group consisting of alkyl radicals, alkylether radicals, alkylester radicals, alkylketone radicals and alkylcyano radicals or an aralkyl radical having 7 to 13 carbon atoms; $R^2$ is a monovalent substituted or unsubstituted hydrocarbon radical having 1 to 13 carbon atoms and b is a whole number equal to 0 or 1.

18. The composition of claim 1 wherein the condensation catalyst is a tin compound.

19. The composition of claim 2 wherein the condensation catalyst is a tin compound.

20. A stable, one package, substantially anhydrous and substantially acid-free, room temperature vulcanizable composition comprising a polymethoxy-terminated polydimethylsiloxane, an effective amount of a tin containing condensation catalyst, and a stabilizing amount of scavenger for hydroxy functional groups having the formula

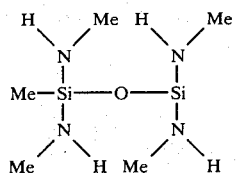

21. A stable, one package, substantially anhydrous and substantially acid free, room temperature vulcanizable composition comprising a polymethoxy terminated polydimethylsiloxane, an effective amount of a tin containing condensation catalyst, and a stabilizing amount of scavenger for hydroxy functional groups having the formula

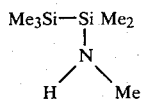

22. A stable, one package, substantially anhydrous and substantially acid free, room temperature vulcanizable composition comprising a polymethoxy terminated or silanol terminated polydimethylsiloxane, an effective amount of a tin containing condensation catalyst, and a stabilizing amount of scavenger for hydroxy functional groups having the formula

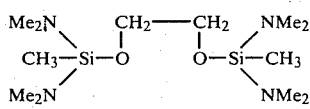

23. A stable, one package, substantially anhydrous and substantially acid-free room temperature vulcanizable organopolysiloxane composition stable under ambient conditions in the substantial absence of moisture over an extended period of time and convertible to a tack-free elastomer comprising:
(A) a silanol-terminated organosiloxane base polymer;
(B) an effective amount of condensation catalyst;
(C) a stabilizing amount of scavenger for hydroxy functional groups having the general formula

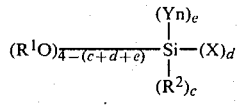

where $R^1$ is an aliphatic radical having 1 to 8 carbon atoms and is selected from the group consisting of alkyl radicals, alkylether radicals, alkylester radicals, alkylketone radicals and alkylcyano radicals or an aralkyl radical having 7 to 13 carbon atoms; $R^2$ is a monovalent substituted or unsubstituted hydrocarbon radical having 1 to 13 carbon atoms; X is a hydrolyzable leaving group selected from the group consisting of amido, amino, carbamato, enoxy, imidato, isocyanato, oximato, thioisocyanato and ureido radicals; Y is selected from the group consisting of moieties of Si, O, S, N, P, C, B, Sn, Pb, Ca, hydrazine, azo radicals, CO, $CO_2$, organic peroxides and metal oxides of the formula $AO_z$ where A is selected from the group consisting of B, S, Sn, P, Al, Ti, V, Tl, Ir, Pb, Pt, Pd and Fe and where z is sufficient to satisfy chemical valence requirements; where C is attached to at least one other Y moiety; c is an integer equal to 0 to 1; d is an integer equal to 1 or 2; e is an integer equal to 1 or 2; the sum of c+d+e equals 2 or 3; n equals at least 1; or

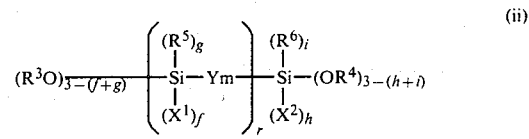

where $R^3$ and $R^4$ are aliphatic radicals having 1 to 8 carbon atoms and are selected from the group consisting of alkyl radicals, alkylether radials, alkylester radicals, alkylketone radicals and alkylcyano radicals or an aralkyl radical having 7 to 13 carbon atoms; $R^5$ and $R^6$ are monovalent substituted or unsubstituted hydrocarbon radicals having 1 to 13 carbon atoms or Yn; Y is selected from the group consisting of moieties of Si, O, S, N, P, C, B, Sn, Pb, Ca, hydrazine, azo radicals, CO, $CO_2$, organic peroxides and metal oxides of the formula $AO_z$ where A is selected from the group consisting of B, S, Sn, P, Al, Ti, V, Tl, Ir, Pb, Pt, Pd and Fe, and z is sufficient to satisfy chemical valence requirements; $X^1$ and $X^2$ are hydrolyzable leaving groups selected from the group consisting of amido, amino, carbamato, enoxy, imidato, isocyanato, oximato, thioisocyanato and ureido radicals; f is an integer equal to 0 to 3 inclusive; g is an integer equal to 0 to 3 inclusive; h is an integer equal to 0 to 3 inclusive; i is an integer equal to 0 to 3 inclusive; the sum of f+g equals 0 to 3 inclusive; the sum of h+f equals at least 1; the sum of h+i equals at 0 to 3 inclusive; there being at least one alkoxy group, m is equal to 0 or more and r is equal to at least 1; or (iii) a cyclic compound with at least one silicon atom as a member of the ring, said silicon atom having attached thereto a hydrolyzable leaving group selected from the group consisting of amido, amino, carbamato, enoxy, imidato, isocyanato, oximato, thioisocyanato and ureido radicals; and wherein at least 1 of said silicon atoms has attached thereto an alkoxy radical having an aliphatic group of 1 to 8 carbon atoms selected from the group consisting of alkyl radicals, alkylether radicals, alkylester radicals, alkylketone radicals, and alkylcyano radicals or an aralkyl radical having 7 to 13 carbon atoms, (iv) mixtures of (i) and (ii) and (iii);

(D) an effective amount of curing accelerator selected from the group consisting of substituted guanidines, amines and mixtures thereof;

(E) an effective amount of a crosslinking silane of the formula

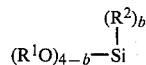

where $R^1$ is an aliphatic radical having 1 to 8 carbon atoms and is selected from the group consisting of alkyl radicals, alkylether radicals, alkylester radicals, alkylketone radicals and alkylcyano radicals or an aralkyl radical having 7 to 13 carbon atoms, $R^2$ is a monovalent substituted or unsubstituted hydrocarbon radical having 1 to 13 carbon atoms and b is a whole number equal to 0 or 1.

24. A stable, one package, substantially anhydrous and substantially acid-free room temperature vulcanizable organopolysiloxane composition stable under ambient conditions in the substantial absence of moisture over an extended period of time and convertible to a tack-free elastomer comprising:

(A) an alkoxy-terminated organosiloxane base polymer;

(B) an effective amount of condensation catalyst;

(C) a stabilizing amount of scavenger for hydroxy functional groups having the general formula

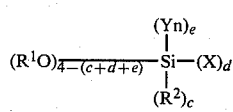 (i)

where $R^1$ is an aliphatic radical having 1 to 8 carbon atoms and is selected from the group consisting of alkyl radicals, alkylether radicals, alkylester radicals, alkylketone radicals and alkylcyano radicals or an aralkyl radical having 7 to 13 carbon atoms; $R^2$ is a monovalent substituted or unsubstituted hydrocarbon radical having 1 to 13 carbon atoms; X is a hydrolyzable leaving group selected from the group consisting of amido, amino, carbamato, enoxy, imidato, isocyanato, oximato, thioisocyanato and ureido radicals; Y is selected from the group consisting of moieties of Si, O, S, N, P, C, B, Sn, Pb, Ca, hydrazine, azo radicals, CO, $CO_2$, organic peroxides and metal oxides of the formula $AO_z$ where A is selected from the group consisting of B, S, Sn, P, Al, Ti, V, Tl, Ir, Pb, Pt, Pd and Fe and where z is sufficient to satisfy chemical valence requirements; where C is attached to at least one other Y moiety; c is an integer equal to 0 to 2; d is an integer equal to 1 to 3; e is an integer equal to 1 to 3; the sum of c+d+e equals 2 to 4; n equals at least 1; or

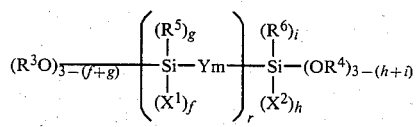 (ii)

where $R^3$ and $R^4$ are aliphatic radicals having 1 to 8 carbon atoms and are selected from the group consisting of alkyl radicals, alkylether radials, alkylester radicals, alkylketone radicals and alkylcyano radicals or an aralkyl radical having 7 to 13 carbon atoms; $R^5$ and $R^6$ are monovalent substituted or unsubstituted hydrocarbon radicals having 1 to 13 carbon atoms or Yn; Y is selected from the group consisting of moieties of Si, O, S, N, P, C, B, Sn, Pb, Ca, hydrazine, azo radicals, CO, $CO_2$, organic peroxides and metal oxides of the formula $AO_z$ where A is selected from the group consisting of B, S, Sn, P, Al, Ti, V, Tl, Ir, Pb, Pt, Pd and Fe, and z is sufficient to satisfy chemical valence requirements; $X^1$ and $X^2$ are hydrolyzable leaving groups selected from the group consisting of amido, amino, carbamato, enoxy, imidato, isocyanato, oximato, thioisocyanato and ureido radicals; f is an integer equal to 0 to 3 inclusive; g is an integer equal to 0 to 3 inclusive; h is an integer equal to 0 to 3 inclusive; i is an integer equal to 0 to 3 inclusive; the sum of f+g equals 0 to 3 inclusive; the sum of h+f equals at least 1; the sum of h+i equals at 0 to 3 inclusive; m is equal to 0 or more and r is equal to at least 1; or (iii) a cyclic compound with at least one silicon atom as a member of the ring, said silicon atom having attached thereto a hydrolyzable leaving group selected from the group consisting of amido, amino, carbamato, enoxy, imidato, isocyanato, oximato, thioisocyanato and ureido radicals; or (iv) mixtures of (i) and (ii) and (iii);

(D) an effective amount of curing accelerator selected from the group consisting of substituted guanidines, amines and mixtures thereof;

(E) an effective amount of a crosslinking silane of the formula

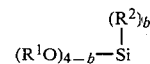

where $R^1$ is an aliphatic radical having 1 to 8 carbon atoms and is selected from the group consisting of alkyl radicals, alkylether radicals, alkylester radicals, alkylketone radicals and alkylcyano radicals or an aralkyl radical having 7 to 13 carbon atoms, $R^2$ is a monovalent substituted or unsubstituted hydrocarbon radical having 1 to 13 carbon atoms and b is a whole number equal to 0 or 1.

25. The composition of claim 23 wherein the condensation catalyst is a tin compound.

26. The composition of claim 24 wherein the condensation catalyst is a tin compound.

27. The composition of claim 23 wherein R, $R^1$, $R^2$, $R^3$, $R^4$, $R^5$ and $R^6$ are methyl.

28. The composition of claim 24 wherein R, $R^1$, $R^2$, $R^3$, $R^4$, $R^5$ and $R^6$ are methyl.

29. A method of making a one package, substantially anhydrous and substantially acid-free room temperature vulcanizable composition curable to the solid elastomeric state, which method comprises agitating under substantially anhydrous conditions at a temperature in the range of 0° C. to 180° C., a room temperature vulcanizable material selected from (I) a mixture comprising:

(A) a silanol-terminated organosiloxane base polymer;

(B) an effective amount of condensation catalyst;

(C) a stabilizing amount of scavenger for hydroxy functional groups having the general formula

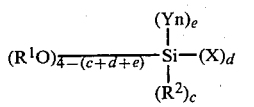

where $R^1$ is an aliphatic radical having 1 to 8 carbon atoms and is selected from the group consisting of alkyl radicals, alkylether radicals, alkylester radicals, alkylketone radicals and alkylcyano radicals or an aralkyl radical having 7 to 13 carbon atoms; $R^2$ is a monovalent substituted or unsubstituted hydrocarbon radical having 1 to 13 carbon atoms; X is a hydrolyzable leaving group selected from the group consisting of amido, amino, carbamato, enoxy, imidato, isocyanato, oximato, thioisocyanato and ureido radicals; Y is selected from the group consisting of moieties of Si, O, S, N, P, C, B, Sn, Pb, Ca, hydrazine, azo radicals, CO, $CO_2$, organic peroxides and metal oxides of the formula $AO_z$ where A is selected from the group consisting of B, S, Sn, P, Al, Ti, V, Tl, Ir, Pb, Pt, Pd and Fe and where z is sufficient to satisfy chemical valence requirements; where C is attached to at least one other Y moiety; c is an integer equal to 0 to 1; d is an integer equal to 1 or 2; e is an integer equal to 1 or 2; the sum of $c+d+e$ equals 2 or 3; n equals at least 1; or

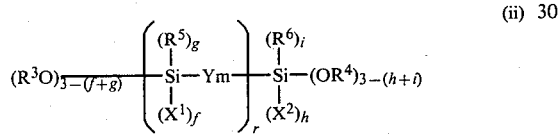

where $R^3$ and $R^4$ are aliphatic radicals having 1 to 8 carbon atoms and are selected from the group consisting of alkyl radicals, alkylether radials, alkylester radicals, alkylketone radicals and alkylcyano radicals or an aralkyl radical having 7 to 13 carbon atoms; $R^5$ and $R^6$ are monovalent substituted or unsubstituted hydrocarbon radicals having 1 to 13 carbon atoms or Yn; Y is selected from the group consisting of moieties of Si, O, S, N, P, C, B, Sn, Pb, Ca, hydrazine, azo radicals, CO, $CO_2$, organic peroxides and metal oxides of the formula $AO_z$ where A is selected from the group consisting of B, S, Sn, P, Al, Ti, V, Tl, Ir, Pb, Pt, Pd and Fe, and z is sufficient to satisfy chemical valence requirements; $X^1$ and $X^2$ are hydrolyzable leaving groups selected from the group consisting of amido, amino, carbamato, enoxy, imidato, isocyanato, oximato, thioisocyanato and ureido radicals; f is an integer equal to 0 to 2 inclusive; g is an integer equal to 0 to 2 inclusive; h is an integer equal to 0 to 3 inclusive; i is an integer equal to 0 to 3 inclusive; the sum of $f+g$ equals 0 to 2 inclusive; the sum of $h+f$ equals at least 1; the sum of $h+i$ equals at 0 to 3 inclusive; there being at least one alkoxy group, m is equal to 0 or more and r is equal to at least 1; or (iii) a cyclic compound with at least one silicon atom as a member of the ring, said silicon atom having attached thereto a hydrolyzable leaving group selected from the group consisting of amido, amino, carbamato, enoxy, imidato, isocyanato, oximato, thioisocyanato and ureido radicals; and wherein at least 1 of said silicon atoms has attached thereto an alkoxy radical having an aliphatic group of 1 to 8 carbon atoms selected from the group consisting of alkyl radicals, alkylether radicals, alkylester radicals, alkylketone radicals, and alkylcyano radicals or an aralkyl radical having 7 to 13 carbon atoms, and wherein the total number of hydrolyzable groups is at least three, or (iv) mixtures of (i) and (ii) and (iii); and where the hydrolyzable group is enoxy;

(D) an effective amount of curing accelerator selected from the group consisting of substituted guanidines, amines and mixtures thereof, and (II) a mixture comprising (A) an alkoxy-terminated organosiloxane base polymer;

(B) an effective amount of condensation catalyst;

(C) a stabilizing amount of scavenger for hydroxy functional groups having the general formula

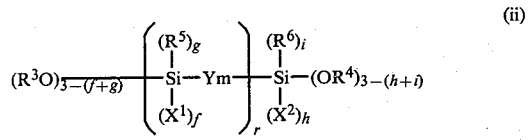

where $R^1$ is an aliphatic radical having 1 to 8 carbon atoms and is selected from the group consisting of alkyl radicals, alkylether radicals, alkylester radicals, alkylketone radicals and alkylcyano radicals or an aralkyl radical having 7 to 13 carbon atoms; $R^2$ is a monovalent substituted or unsubstituted hydrocarbon radical having 1 to 13 carbon atoms; X is a hydrolyzable leaving group selected from the group consisting of amido, amino, carbamato, enoxy, imidato, isocyanato, oximato, thioisocyanato and ureido radicals; Y is selected from the group consisting of moieties of Si, O, S, N, P, C, B, Sn, Pb, Ca, hydrazine, azo radicals, CO, $CO_2$, organic peroxides and metal oxides of the formula $AO_z$ where A is selected from the group consisting of B, S, Sn, P, Al, Ti, V, Tl, Ir, Pb, Pt, Pd and Fe and where z is sufficient to satisfy chemical valence requirements; where C is attached to at least one other Y moiety; c is an integer equal to 0 to 2; d is an integer equal to 1 to 3; e is an integer equal to 1 to 3; the sum of $c+d+e$ equals 2 to 4; n equals at least 1; or

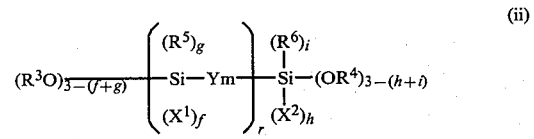

where $R^3$ and $R^4$ are aliphatic radicals having 1 to 8 carbon atoms and are selected from the group consisting of alkyl radicals, alkylether radials, alkylester radicals, alkylketone radicals and alkylcyano radicals or an aralkyl radical having 7 to 13 carbon atoms; $R^5$ and $R^6$ are monovalent substituted or unsubstituted hydrocarbon radicals having 1 to 13 carbon atoms or Yn; Y is selected from the group consisting of moieties of Si, O, S, N, P, C, B, Sn, Pb, Ca, hydrazine, azo radicals, CO, $CO_2$, organic peroxides and metal oxides of the formula $AO_z$ where A is selected from the group consisting of B, S, Sn, P, Al, Ti, V, Tl, Ir, Pb, Pt, Pd and Fe, and z is sufficient to satisfy chemical valence requirements; $X^1$ and $X^2$ are hydrolyzable leaving groups selected from the group consisting of amido, amino, carbamato, enoxy, imidato, isocyanato, oximato, thioisocyanato and ureido radicals; f is an integer equal to 0 to 3 inclusive; g is an integer equal to 0 to 3 inclusive; h is an integer equal to 0 to 3 inclusive; i is an integer equal to 0 to 3 inclusive; the sum of f+g equals 0 to 3 inclusive; the sum of h+f equals at least 1; the sum of h+i equals at 0 to 3 inclusive; m is equal to 0 or more and r is equal to at least 1; or (iii) a cyclic compound with at least one silicon atom as a member of the ring, said silicon atom having attached thereto a hydrolyzable leaving group selected from the group consisting of amido, amino, carbamato, enoxy, imidato, isocyanato, oximato, thioisocyanato and ureido radicals; or (iv) mixtures of (i) and (ii) and (iii).

30. The method of claim 29 wherein ingredient (C) of mixture (I) comprises:

or

where $R^1$ an aliphatic radical having 1 to 8 carbon atoms and is selected from the group consisting of alkyl radicals, alkylether radicals, alkylester radicals, alkylketone radicals and alkylcyano radicals or an aralkyl radical having 7 to 13 carbon atoms; $R^2$ is a monovalent substituted or unsubstituted hydrocarbon radical having 1 to 13 carbon atoms; X is a hydrolyzable leaving group selected from the group consisting of amido, amino, carbamato, enoxy, imidato, isocyanato, oximato, thioisocyanato and ureido radicals; and Y is selected from the group consisting of moieties of Si, O, S, N, P, C, B, Sn, Pb, Ca, hydrazine, azo radicals, CO, $CO_2$, organic peroxides and metal oxides of the formula $AO_z$ where A is selected from the group consisting of B, S, Sn, P, Al, Ti, V, Tl, Ir, Pb, Pt, Pd and Fe and where z is sufficient to satisfy chemical valence requirements; where C is attached to at least one other Y moiety; and where n equals at least 1; or

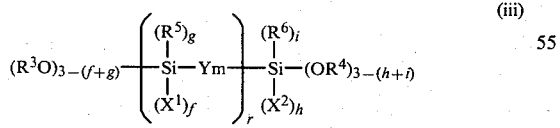

where $R^3$ and $R^4$ are aliphatic radicals having 1 to 8 carbon atoms and are selected from the group consisting of alkyl radicals, alkylether radials, alkylester radicals, alkylketone radicals and alkylcyano radicals or an aralkyl radical having 7 to 13 carbon atoms; $R^5$ and $R^6$ are monovalent substituted or unsubstituted hydrocarbon radicals having 1 to 13 carbon atoms or Yn; Y is selected from the group consisting of moieties of Si, O, S, N, P, C, B, Sn, Pb, Ca, hydrazine, azo radicals, CO, $CO_2$, organic peroxides and metal oxides of the formula $AO_z$ where A is selected from the group consisting of B, S, Sn, P, Al, Ti, V, Tl, Ir, Pb, Pt, Pd and Fe, and z is sufficient to satisfy chemical valence requirements; $X^1$ and $X^2$ are hydrolyzable leaving groups selected from the group consisting of amido, amino, carbamato, enoxy, imidato, isocyanato, oximato, thioisocyanato and ureido radicals; and where Y is not hydrolyzable, f is an integer equal to 0 to 3; g is an integer equal to 0 to 3 inclusive; h is an integer equal to 0 to 2; i is an integer equal to 0 to 2; and $f+h+[3-(f+g)]+[3-(h+i)]$ equals at least 3; and where Y is hydrolyzable, f is an integer equal to 0 to 2, g is an integer equal to 0 to 2, h is an integer equal to 0 to 2, i is an integer equal to 0 to 2, and $f+[3-(f+g)]$ equals at least 2 or $h+[3-(h+i)]$ equals at least 2; n equals 1 or more and r equals at least 1;

(iv) a cyclic compound with at least three silicon atoms as members of the ring wherein at least one of said silicon atoms has attached thereto a hydrolyzable leaving group selected from the group consisting of amino, amido, carbamato, enoxy, imidato, isocyanato, oximato, thioisocyanato and ureido radicals, and wherein zero or more of said silicon atoms has attached thereto an alkoxy radical having an aliphatic group of 1 to 8 carbon atoms selected from the group consisting of alkyl radicals, alkylketone radicals, alkylcyano radicals or an aralkyl radical having 7 to 13 carbon atoms;

and ingredient (C) of mixture (II) comprises

or

or

where $R^1$ an aliphatic radical having 1 to 8 carbon atoms and is selected from the group consisting of alkyl radicals, alkylether radicals, alkylester radicals, alkylketone radicals and alkylcyano radicals or an aralkyl radical having 7 to 13 carbon atoms; $R^2$ is a monovalent substituted or unsubstituted hydrocarbon radical having 1 to 13 carbon atoms; X is a hydrolyzable leaving group selected from the group consisting of amido, amino, carbamato, enoxy, imidato, isocyanato, oximato, thioisocyanato and ureido radicals; and Y is selected from the group consisting of moieties of Si, O, S, N, P, C, B, Sn, Pb, Ca, hydrazine, azo radicals, CO, $CO_2$, organic peroxides and metal oxides of the formula $AO_z$ where A is selected from the group consisting of B, S, Sn, P, Al, Ti, V, Tl, Ir, Pb, Pt, Pd and Fe and where z is sufficient to satisfy chemical valence requirements; where C is attached to at least one other Y moiety; and where n equals at least 1; or

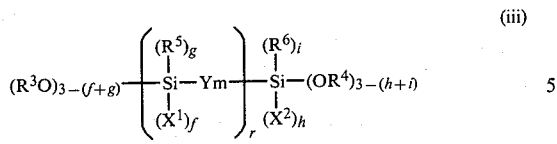
(iii)

where $R^3$ and $R^4$ are aliphatic radicals having 1 to 8 carbon atoms and are selected from the group consisting of alkyl radicals, alkylether radials, alkylester radicals, alkylketone radicals and alkylcyano radicals or an aralkyl radical having 7 to 13 carbon atoms; $R^5$ and $R^6$ are monovalent substituted or unsubstituted hydrocarbon radicals having 1 to 13 carbon atoms or Yn; Y is selected from the group consisting of moieties of Si, O, S, N, P, C, B, Sn, Pb, Ca, hydrazine, azo radicals, CO, $CO_2$, organic peroxides and metal oxides of the formula $AO_z$ where A is selected from the group consisting of B, S, Sn, P, Al, Ti, V, Tl, Ir, Pb, Pt, Pd and Fe, and z is sufficient to satisfy chemical valence requirements; $X^1$ and $X^2$ are hydrolyzable leaving groups selected from the group consisting of amido, amino, carbamato, enoxy, imidato, isocyanato, oximato, thioisocyanato and ureido radicals; and where Y is not hydrolyzable, f is an integer equal to 0 to 3; g is an integer equal to 0 to 3 inclusive; h is an integer equal to 0 to 3; i is an integer equal to 0 to 3, and $f+h+[3-(f+g)]+[3-(h+i)]$ equals at least 3; and where Y is hydrolyzable, f is an integer equal to 0 to 2, g is an integer equal to 0 to 2, h is an integer equal to 0 to 2, i is an integer equal to 0 to 2, and $f+[3-(f+g)]$ equals at least 2 or $h+[3-(h+i)]$ equals at least 2; n equals 1 or more and r equals at least 1;

(iv) or a cyclic compound with at least three silicon atoms as members of the ring wherein at least one of said silicon atoms has attached thereto a hydrolyzable leaving group selected from the group consisting of amido, amino, carbamato, enoxy, imidato, isocyanato, oximato, thioisocyanato and ureido radicals, and wherein at least one of said silicon atoms has attached thereto an alkoxy radical having an aliphatic group of 1 to 8 carbon atoms selected from the group consisting of alkyl radicals, alkylether radicals, alkylester radicals, alkylketone radicals and alkylcyano radicals or an aralkyl radical having 7 to 13 carbon atoms, and wherein the total number of alkoxy plus hydrolyzable radicals equals 3 or more.

31. The method of claim 29 wherein the hydrolyzable groups of ingredient (C) of mixture (I) and mixture (II) are selected from the group consisting of amido, amino, carbamato, imidato, isocyanato, oximato, thioisocyanato and ureido radicals, and wherein the hydrolyzable groups of ingredient (C) of mixture (II) are selected from amido, amino, carbamato, enoxy, imidato, isocyanato, oximato, thioisocyanato and ureido radicals; mixtures (I) and (II) further comprising an effective amount of curing accelerator selected from the group consisting of substituted guanidines, amines and mixtures thereof.

32. The method of claim 29 wherein mixture (I) and mixture (II) further comprise an effective amount of a crosslinking silane of the formula

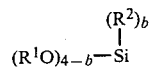

where $R^1$ is an aliphatic radical having from 1 to 8 carbon atoms and is selected from the group consisting of alkyl radicals, alkylether radicals, alkylester radicals, alkylketone radicals and alkylcyano radicals or an aralkyl radical having 7 to 13 carbon atoms; $R^2$ is a monovalent substituted or unsubstituted hydrocarbon radical having 1 to 13 carbon atoms and b is a whole number equal to 0 or 1.

33. The method of claim 29 wherein the alkoxy terminated base polymer of mixture (II) has the formula

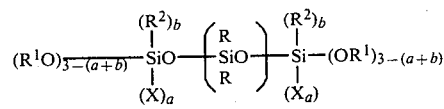

where R is a monovalent substituted or unsubstituted hydrocarbon radical having 1 to 13 carbon atoms, $R^1$ is an aliphatic organic radical having 1 to 8 carbon atoms selected from the group consisting of alkyl, alkylether, alkylester, alkylketone and alkylcyano radicals or an aralkyl radical having 7 to 13 carbon atoms; $R^2$ is a monovalent substituted or unsubstituted hydrocarbon radical having 1 to 13 carbon atoms; X is a hydrolyzable leaving group selected from the group consisting of amido, amino, carbamato, enoxy, imidato, isocyanato, oximato, thioisocyanato and ureido radicals and a is a whole number equal to 0 or 1 and the sum of $a+b$ equals 0 or 1, and s is an integer having a value of from about 50 to 2500.

34. The method of claim 29 wherein the alkoxy terminated base polymer of mixture (II) has the formula

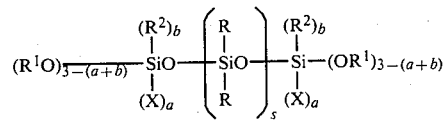

where R is a monovalent substituted or unsubstituted hydrocarbon radical having 1 to 13 carbon atoms, $R^1$ is an aliphatic organic radical having 1 to 8 carbon atoms selected from the group consisting of alkyl, alkylether, alkylester, alkylketone and alkylcyano radicals or an aralkyl radical having 7 to 13 carbon atoms; $R^2$ is a monovalent substituted or unsubstituted hydrocarbon radical having 1 to 13 carbon atoms; X is a hydrolyzable leaving group selected from the group consisting of amido, amino, carbamato, enoxy, imidato, isocyanato, oximato, thioisocyanato and ureido radicals and a is a whole number equal to 0 or 2, b is a whole number equal to 0 to 2 and the sum of $a+b$ equals 2, and s is an integer having a value of from about 50 to 2500.

35. The method of claim 29 wherein in mixture (II) the scavenger for hydroxy functional groups has the general formula

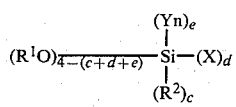

$$(R^1O)_{\overline{4-(c+d+e)}}\text{Si}-(X)_d \quad \text{(i)}$$
with $(Y_n)_e$ above and $(R^2)_c$ below the Si.

where $R^1$ is an aliphatic radical having from 1 to 8 carbon atoms and is selected from the group consisting of alkyl radicals, alkylether radicals, alkylester radicals, alkylketone radicals and alkylcyano radicals or an aralkyl radical having from 7 to 13 carbon atoms; $R^2$ is a monovalent substituted or unsubstituted hydrocarbon radical having 1 to 13 carbon atoms; X is a hydrolyzable leaving X is a hydrolyzable leaving group selected from the group consisting of amido, amino, carbamato, enoxy, imidato, isocyanato, oximato, thioisocyanato and ureido radicals; Y is selected from the group consisting of moieties of Si, O, S, N, P, C, B, Sn, Pb, Ca, hydrazine, azo radicals, CO, $CO_2$, organic peroxides and metal oxides of the formula $AO_z$ where A is selected from the group consisting of B, S, Sn, P, Al, Ti, V, Tl, Ir, Pb, PT, Pd and Fe and where z is sufficient to satisfy chemical valence requirements; where C is attached to at least one other Y moiety; c is an integer equal to 0 to 2 inclusive; d is an integer equal to 1 or 2; e is an integer equal to 1 to 3 inclusive; the sum of $d+[4-(c+d+e)]$ equals 1 or 2, n equals at least 1; or

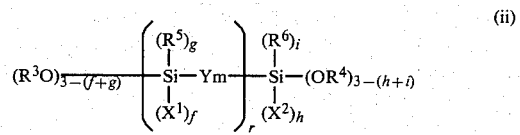

(ii)

where $R^3$ and $R^4$ are aliphatic radicals having 1 to 8 carbon atoms and are selected from the group consisting of alkyl radicals, alkylether radicals, alkylester radicals, alkylketone radicals and alkylcyano radicals or an aralkyl radical having 7 to 13 carbon atoms; $R^5$ and $R^6$ are monovalent substituted or unsubstituted hydrocarbon radicals having 1 to 13 carbon atoms or $Y_n$; Y is selected from the group consisting of moieties of Si, O, S, N, P, C, B, Sn, Pb, Ca, hydrazine, azo radicals, CO, $CO_2$, organic peroxides and metal oxides of the formula $AO_z$ where A is selected from the group consisting of B, S, Sn, P, Al, Ti, V, Tl, Ir, Pb, Pt, Pd and Fe, and z is sufficient to satisfy chemical valence requirements; $X^1$ and $X^2$ are hydrolyzable leaving groups selected from the group consisting of amido, amino, carbamato, enoxy, imidato, isocyanato, oximato, thioisocyanato and ureido radicals; and where $Y_m$ is not hydrolyzable, f is an integer equal to 0 to 2; g is an integer equal to 0 to 3; h is an integer equal to 0 to 2; i is an integer equal to 0 to 3 and $f+h+[3-(f+g)]+[3-(h+i)]$ equals 1 or 2, and $f+h$ equals at least 1; and where $Y_m$ is hydrolyzable, f is an interger equal to 0 or 2, g is an integer equal to 0 to 3, h is an integer equal to 0 to 2, i is an integer equal to 0 to 2 and $f+[3-(f+g)]$ equals 0 or 1, $h+[3-(h+i)]$ equals 0 or 1, $f+h$ equals 1 or 2; and the total number of hydrolyzable group does not exceed 2;

(iii) a cyclic compound with at least three silicon atoms as members of the ring wherein at least one of said silicon atoms has attached thereto a hydrolyzable leaving group selected from the group consisting of amido, amino, carbamato, enoxy, imidato, isocyanato, oximato, thioisocyanato and ureido radicals, and wherein at least one of said silicon atoms has attached thereto an alkoxy radical having an aliphatic group of 1 to 8 carbon atoms selected from the group consisting of alkyl radicals, alkylether radicals, alkylester radicals, alkylketone radicals and alkylcyano radicals or an aralkyl radical having 7 to 13 carbon atoms;

(iv) mixtures of (i), (ii) and (iii);

further comprising an effective amount of a crosslinking silane of the formula

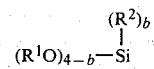

where $R^1$ is an aliphatic radical having 1 to 8 carbon atoms and is selected from the group consisting of alkyl radicals, alkylether radicals, alkylester radicals, alkylketone radicals and alkylcyano radicals or an aralkyl radical having 7 to 13 carbon atoms; $R^2$ is a monovalent substituted or unsubstituted hydrocarbon radical having 1 to 13 carbon atoms and b is a whole number equal to 0 or 1.

36. The method of claim 29 wherein the condensation catalyst of mixture (I) and mixture (II) is a tin compound.

37. A method of making a one package, substantially anhydrous and substantially acid-free room temperature vulcanizable composition curable to the solid elastomeric state, which method comprises agitating under substantially anhydrous conditions at a temperature in the range of 0° C. to 180° C., a room temperature vulcanizable material selected from (I) a mixture comprising:

(A) a silanol-terminated organosiloxane base polymer;

(B) an effective amount of condensation catalyst;

(C) a stabilizing amount of scavenger for hydroxy functional groups having the general formula

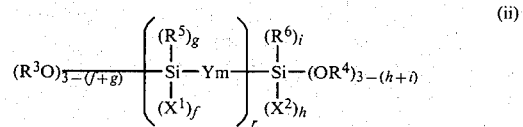

(ii)

where $R^1$ is an aliphatic radical having 1 to 8 carbon atoms and is selected from the group consisting of alkyl radicals, alkylether radicals, alkylester radicals, alkylketone radicals and alkylcyano radicals or an aralkyl radical having 7 to 13 carbon atoms; $R^2$ is a monovalent substituted or unsubstituted hydrocarbon radical having 1 to 13 carbon atoms; X is a hydrolyzable leaving group selected from the group consisting of amido, amino, carbamato, enoxy, imidato, isocyanato, oximato, thioisocyanato and ureido radicals; Y is selected from the group consisting of moieties of Si, O, S, N, P, C, B, Sn, Pb, Ca, hydrazine, azo radicals, CO, $CO_2$, organic peroxides and metal oxides of the formula $AO_z$ where A is selected from the group consisting of B, S, Sn, P, Al, Ti, V, Tl, Ir, Pb, Pt, Pd and Fe and where z is sufficient to satisfy chemical valence requirements; where C is attached to at least one other Y moiety; c is an integer equal to 0 to 1; d is an integer equal to 1 or 2; e is an integer equal to 1 or 2; the sum of c+d+e equals 2 or 3; n equals at least 1; or

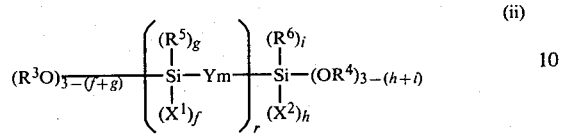
(ii)

where $R^3$ and $R^4$ are aliphatic radicals having 1 to 8 carbon atoms and are selected from the group consisting of alkyl radicals, alkylether radials, alkylester radicals, alkylketone radicals and alkylcyano radicals or an aralkyl radical having 7 to 13 carbon atoms; $R^5$ and $R^6$ are monovalent substituted or unsubstituted hydrocarbon radicals having 1 to 13 carbon atoms or Yn; Y is selected from the group consisting of moieties of Si, O, S, N, P, C, B, Sn, Pb, Ca, hydrazine, azo radicals, CO, $CO_2$, organic peroxides and metal oxides of the formula $AO_z$ where A is selected from the group consisting of B, S, Sn, P, Al, Ti, V, Tl, Ir, Pb, Pt, Pd and Fe, and z is sufficient to satisfy chemical valence requirements; $X^1$ and $X^2$ are hydrolyzable leaving groups selected from the group consisting of amido, amino, carbamato, enoxy, imidato, isocyanato, oximato, thioisocyanato and ureido radials; f is an integer equal to 0 to 3 inclusive; g is an integer equal to 0 to 3 inclusive; h is an integer equal to 0 to 3 inclusive; i is an integer equal to 0 to 3 inclusive; the sum of f+g equals 0 to 3 inclusive; the sum of h+f equals at least 1; the sum of h+i equals at 0 to 3 inclusive; there being at least one alkoxy group inclusive, m is equal to 0 or more and r is equal to at least 1; or (iii) a cyclic compound with at least one silicon atom as a member of the ring, said silicon atom having attached thereto a hydrolyzable leaving group selected from the group consisting of amido, amino, carbamato, enoxy, imidato, isocyanato, oximato, thioisocyanato and ureido radicals; and wherein at least 1 of said silicon atoms has attached thereto an alkoxy radical having an aliphatic group of 1 to 8 carbon atoms selected from the group consisting of alkyl radicals, alkylether radicals, alkylester radicals, alkylketone radicals, and alkylcyano radicals or an aralkyl radical having 7 to 13 carbon atoms, or (iv) mixtures of (i) and (ii) and (iii); and where the hydrolyzable group is enoxy (D) an effective amount of curing accelerator selected from the group consisting of substituted guanidines, amines and mixtures thereof; and (E) an effective amount of a crosslinking silane of the formula

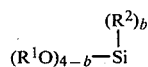

where $R^1$ is an aliphatic radical having 1 to 8 carbon atoms and is selected from the group consisting of alkyl radicals, alkylether radicals, alkylester radicals, alkylketone radicals and alkylcyano radicals or an aralkyl radical having 7 to 13 carbon atoms, $R^2$ is a monovalent substituted or unsubstituted hydrocarbon radical having 1 to 13 carbon atoms and b is a whole number equal to 0 or 1, (II) a mixture comprising (A) an alkoxy-terminated organosiloxane base polymer;

(B) an effective amount of condensation catalyst;

(C) a stabilizing amount of scavenger for hydroxy functional groups having the general formula

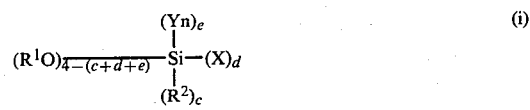
(i)

where $R^1$ is an aliphatic radical having 1 to 8 carbon atoms and is selected from the group consisting of alkyl radicals, alkylether radicals, alkylester radicals, alkylketone radicals and alkylcyano radicals or an aralkyl radical having 7 to 13 carbon atoms; $R^2$ is a monovalent substituted or unsubstituted hydrocarbon radical having 1 to 13 carbon atoms; X is a hydrolyzable leaving group selected from the group consisting of amido, amino, carbamato, enoxy, imidato, isocyanato, oximato, thioisocyanato and ureido radicals; Y is selected from the group consisting of moieties of Si, O, S, N, P, C, B, Sn, Pb, Ca, hydrazine, azo radicals, CO, $CO_2$, organic peroxides and metal oxides of the formula $AO_z$ where A is selected from the group consisting of B, S, Sn, P, Al, Ti, V, Tl, Ir, Pb, Pt, Pd and Fe and where z is sufficient to satisfy chemical valence requirements; where C is attached to at least one other Y moiety; c is an integer equal to 0 to 2; d is an integer equal to 1 to 3; e is an integer equal to 1 to 3; the sum of c+d+e equals 2 to 4; n equals at least 1; or

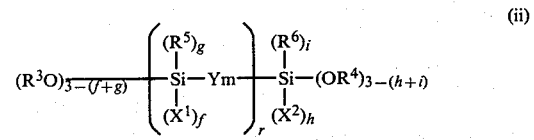
(ii)

where $R^3$ and $R^4$ are aliphatic radicals having 1 to 8 carbon atoms and are selected from the group consisting of alkyl radicals, alkylether radials, alkylester radicals, alkylketone radicals and alkylcyano radicals or an aralkyl radical having 7 to 13 carbon atoms; $R^5$ and $R^6$ are monovalent substituted or unsubstituted hydrocarbon radicals having 1 to 13 carbon atoms or Yn; Y is selected from the group consisting of moieties of Si, O, S, N, P, C, B, Sn, Pb, Ca, hydrazine, azo radicals, CO, $CO_2$, organic peroxides and metal oxides of the formula $AO_z$ where A is selected from the group consisting of B, S, Sn, P, Al, Ti, V, Tl, Ir, Pb, Pt, Pd and Fe, and z is sufficient to satisfy chemical valence requirements; $X^1$ and $X^2$ are hydrolyzable leaving groups selected from the group consisting of amido, amino, carbamato, enoxy, imidato, isocyanato, oximato, thioisocyanato and ureido radicals; f is an integer equal to 0 to 3 inclusive; g is an integer equal to 0 to 3 inclusive; h is an integer equal to 0 to 3 inclusive; i is an integer equal to 0 to 3 inclusive; the sum of f+g equals 0 to 3 inclusive; the sum of h+f equals at least 1; the sum of h+i equals at 0 to 3 inclusive; m is equal to 0 or more and r is equal to at least 1; or (iii) a cyclic compound with at least one silicon atom as a member of the ring, said silicon atom having attached thereto a hydrolyzable leaving group selected from the group consisting of amido, amino, carbamato, enoxy, imidato, isocyanato, oximato, thioisocyanato and ureido radicals; or (iv) mixtures of (i) and (ii) and (iii);

(D) an effective amount of curing accelerator selected from the group consisting of substituted guanidines, amines and mixtures thereof, (E) an effective amount of a crosslinking silane of the formula

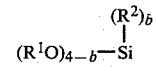

where $R^1$ is an aliphatic radical having 1 to 8 carbon atoms and is selected from the group consisting of alkyl radicals, alkylether radicals, alkylester radicals, alkylketone radicals and alkylcyano radicals or an aralkyl radical having 7 to 13 carbon atoms, $R^2$ is a monovalent substituted or unsubstituted hydrocarbon radical having 1 to 13 carbon atoms and b is a whole number equal to 0 or 1.

* * * * *